(12) United States Patent
Ogawa

(10) Patent No.: US 10,357,832 B2
(45) Date of Patent: Jul. 23, 2019

(54) DRILL AND METHOD FOR MANUFACTURING MACHINED PRODUCT USING SAME

(71) Applicant: KYOCERA Corporation, Kyoto-shi, Kyoto (JP)

(72) Inventor: Hiroshi Ogawa, Omihachiman (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/520,951

(22) PCT Filed: Oct. 21, 2015

(86) PCT No.: PCT/JP2015/079652
§ 371 (c)(1),
(2) Date: Apr. 21, 2017

(87) PCT Pub. No.: WO2016/063893
PCT Pub. Date: Apr. 28, 2016

(65) Prior Publication Data
US 2017/0341159 A1    Nov. 30, 2017

(30) Foreign Application Priority Data

Oct. 24, 2014 (JP) ................................. 2014-217108
Nov. 26, 2014 (JP) ................................. 2014-239034
Jan. 26, 2015 (JP) ................................. 2015-012497

(51) Int. Cl.
*B23B 51/02* (2006.01)
*B23B 51/00* (2006.01)

(52) U.S. Cl.
CPC ............. *B23B 51/02* (2013.01); *B23B 51/00* (2013.01); *B23B 2228/10* (2013.01); *B23B 2251/085* (2013.01); *B23B 2251/14* (2013.01)

(58) Field of Classification Search
CPC ..... B23B 51/02; B23B 51/06; B23B 2251/14; B23B 2251/18; B23B 2260/072
See application file for complete search history.

(56) References Cited

U.S. PATENT DOCUMENTS 2,348,874 A  *  5/1944  Andreasson ............ B23B 51/02
                                                    408/230
4,629,373 A  *  12/1986  Hall ....................... B23B 27/146
                                                    175/434
(Continued)

FOREIGN PATENT DOCUMENTS

CN        103223502 A        7/2013
DE        3730377 A1  *  3/1989  ............. B23B 51/02
(Continued)

OTHER PUBLICATIONS

Description WO2012159881 (translation) obtained at https://worldwide.espacenet.com/ (last visited Nov. 15, 2018).*
(Continued)

*Primary Examiner* — Ryan C Rufo
(74) *Attorney, Agent, or Firm* — Viering, Jentschura & Partner MBB

(57) ABSTRACT

A drill is provided with a body having a rod shape configured to rotate about a rotational axis, a cutting edge that is located at a tip portion of the body and extends from an outer periphery of the body toward the rotational axis when viewed from the tip portion, a flank located at the tip portion and disposed along the cutting edge, a covering layer that covers at least the tip portion of the body, and one or more recessed portions disposed on the flank at positions close to the cutting edge.

4 Claims, 21 Drawing Sheets

(56) References Cited

U.S. PATENT DOCUMENTS

| | | | |
|---|---|---|---|
| 4,753,562 A | 6/1988 | Hirayoshi | |
| 4,950,108 A | 8/1990 | Roos | |
| 4,984,944 A * | 1/1991 | Pennington, Jr. | B23B 51/0009 408/227 |
| 5,011,342 A * | 4/1991 | Hsu | B23B 51/02 408/224 |
| 5,022,801 A * | 6/1991 | Anthony | B23B 51/02 408/144 |
| 5,452,971 A | 9/1995 | Nevills | |
| 6,056,486 A * | 5/2000 | Colvin | B23B 51/02 407/11 |
| 6,902,359 B2 * | 6/2005 | Kraemer | B23B 51/0009 408/227 |
| 9,144,845 B1 * | 9/2015 | Grzina | B23B 27/00 |
| 2004/0253379 A1 * | 12/2004 | Sugita | B23B 51/02 427/355 |
| 2008/0023230 A1 * | 1/2008 | Cho | B23B 51/02 175/432 |
| 2009/0110501 A1 | 4/2009 | Drori et al. | |
| 2009/0183603 A1 * | 7/2009 | Kozak | B23B 51/00 81/53.2 |
| 2011/0116884 A1 * | 5/2011 | Li | B23B 51/02 408/223 |
| 2012/0009034 A1 * | 1/2012 | Mack | B23B 51/02 408/226 |
| 2013/0115020 A1 * | 5/2013 | Schwarz | B23B 51/02 408/230 |
| 2013/0223943 A1 * | 8/2013 | Gey | B23B 51/06 408/59 |
| 2013/0302102 A1 * | 11/2013 | Green | B23B 51/02 408/144 |
| 2016/0175944 A1 * | 6/2016 | Lyu | B23B 51/02 407/54 |

FOREIGN PATENT DOCUMENTS

| | | | |
|---|---|---|---|
| DE | 102010045388 A1 * | 3/2012 | B23B 51/00 |
| EP | 1852202 A1 * | 11/2007 | B23B 51/00 |
| EP | 3115137 A1 * | 1/2017 | B23B 51/02 |
| JP | S51-033372 A | 3/1976 | |
| JP | 60-242907 A * | 12/1985 | B23B 51/06 |
| JP | S62-024112 U1 | 2/1987 | |
| JP | 01321109 A * | 12/1989 | B23C 5/1081 |
| JP | 05044012 A * | 8/1991 | C23C 14/02 |
| JP | H05-029615 U | 4/1993 | |
| JP | H07-80715 A | 3/1995 | |
| JP | 2003-117708 A | 4/2003 | |
| JP | 2007-050477 A | 3/2007 | |
| JP | 2011-500350 A | 1/2011 | |
| WO | WO-2004050314 A2 * | 6/2004 | B23B 27/10 |
| WO | WO-2012159881 A2 * | 11/2012 | E21B 10/445 |
| WO | WO-2012159947 A2 * | 11/2012 | E21B 10/445 |

OTHER PUBLICATIONS

International Search Report (Form PCT/ISA/210) dated Dec. 28, 2015 and issued for PCT/JP2015/079652.
Written Opinion (Form PCT/ISA/237) dated Dec. 28, 2015, issued for PCT/JP2015/079652.

* cited by examiner

DRILL AND METHOD FOR MANUFACTURING MACHINED PRODUCT USING SAME

TECHNICAL FIELD

The present invention relates to a drill used in cut processing, and a method for manufacturing a machined product.

BACKGROUND ART

Drills such as the drill described in Patent Document 1 have been known as drills used for machining work materials such as metal members. The drill described in Patent Document 1 includes a cutting edge provided to a tip portion surface, and a hard carbon film or a diamond electrodeposited fine grain layer that covers a cutting edge portion.

In the drill thus provided with the cutting edge portion covered with a covering layer of a hard carbon film or the like, the covering layer that covers a flank may partially peel.

CITATION LIST

Patent Literature

Patent Document 1: Japanese Unexamined Patent Application Publication No. 2003-117708A

SUMMARY OF INVENTION

Solution to Problem

A drill according to an aspect of the present invention includes:

a body having a rod shape configured to rotate about a rotational axis, a cutting edge that is located at a tip portion of the body and extends from an outer periphery of the body toward the rotational axis when viewed from the tip portion, a flank located at the tip portion and disposed along the cutting edge, a covering layer that covers at least the tip portion of the body, and one or more recessed portions disposed on the covering layer of the flank at positions close to the cutting edge.

Further, a drill according to another aspect of the present according to the present invention includes:

a body having a rod shape configured to rotate about a rotational axis, a cutting edge that is located at a tip portion of the body and extends from an outer periphery of the body toward the rotational axis when viewed from the tip portion, a flank located at the tip portion and disposed along the cutting edge, and a covering layer that covers at least the tip portion of the body, the covering layer of the flank including a surface portion provided with one or more first layers disposed at positions close to the cutting edge, and a second layer other than the first layers, the first layers each having a hardness less than that of the second layer.

Further, a method for manufacturing a machined product according to an aspect of the present invention includes:

rotating the drill about the rotational axis, causing the cutting edge of the drill that is rotating to come into contact with a work material, and separating the drill from the work material.

DESCRIPTION OF EMBODIMENT

Drill

Figure 1:
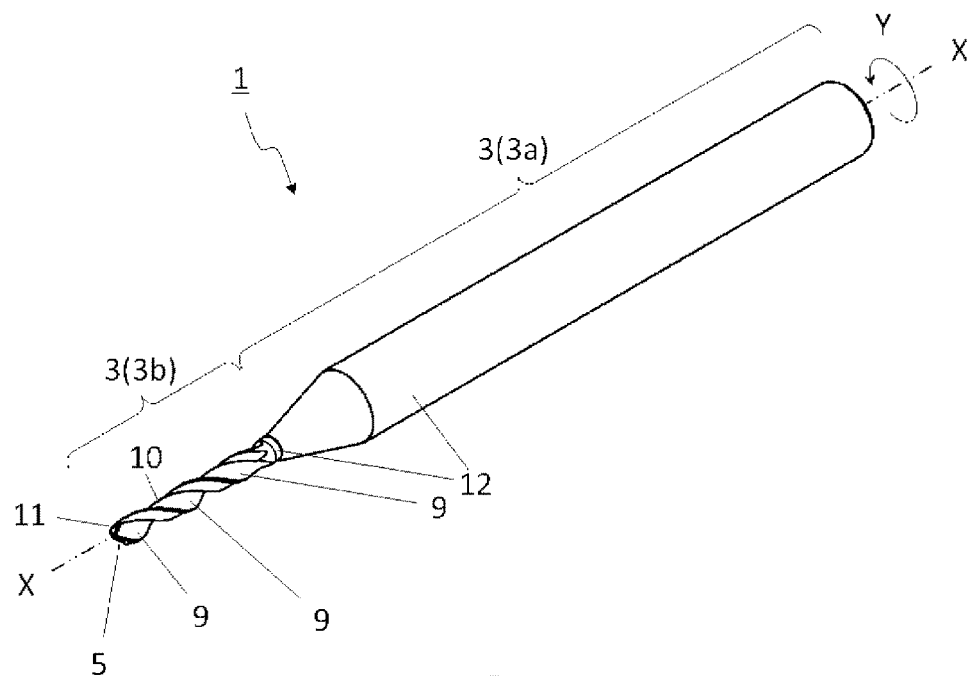
FIG. 1 is a perspective view illustrating a drill according to a first embodiment of the present invention.
Figure 2:
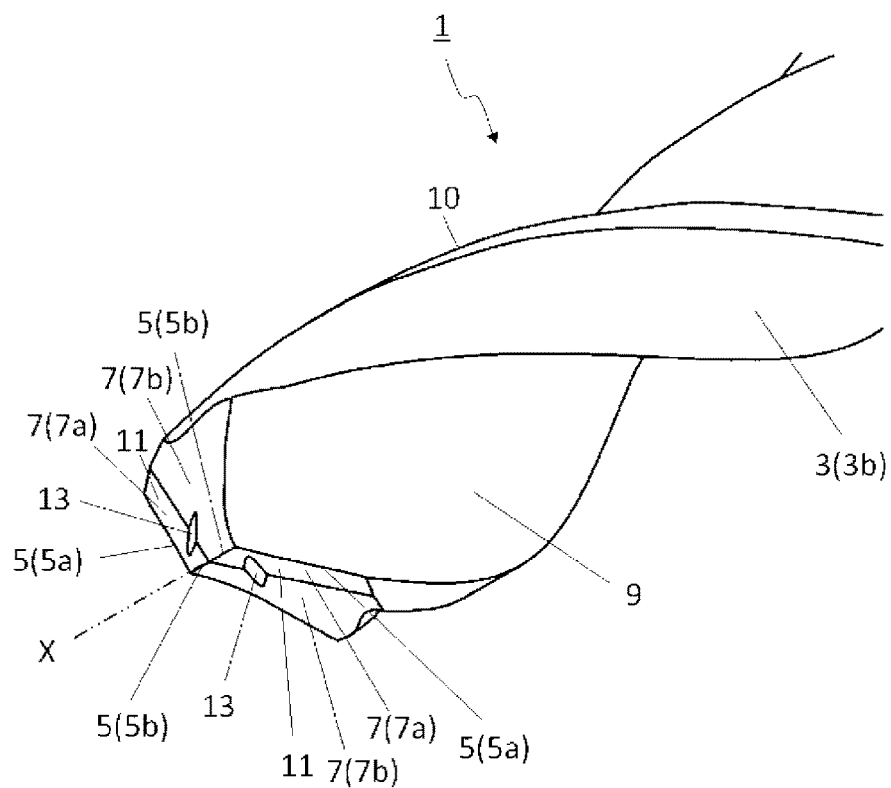
FIG. 2 is an enlarged perspective view of a tip part of the drill illustrated in FIG. 1.

The following describes in detail a drill according to an embodiment of the present invention using the drawings. Note that, for ease of explanation, each of the drawings referenced below are simplified drawings illustrating only the main parts among the constituent members according to the embodiment required for describing the present invention. Thus, the drill according to the present invention may be provided with any constituent members not illustrated in the referenced drawings. Further, the dimensions of the members in the drawings do not faithfully represent the actual dimensions of the constituent members, the dimension ratios of the members, or the like.

A drill 1 according to a first embodiment illustrated in FIGS. 1 to 11 includes a body 3, a cutting edge 5, flanks 7, discharge flutes 9 (hereinafter also simply referred to as "flutes 9"), a covering layer 11, and recessed portions 13.

The body 3 has a rotational axis X, and a rod shape that extends along this rotational axis X. The body 3 is configured to rotate about the rotational axis X during the cut processing of a work material for manufacturing a machined product. The body 3 according to the present embodiment includes a gripped portion 3a gripped by a spindle or the like rotated by a machine tool (not illustrated), and a cutting portion 3b positioned on a tip portion side of this gripped portion 3a. The gripped portion 3a is designed according to the shape of the spindle and the like of the machine tool. The cutting portion 3b includes the cutting edge 5 that comes into contact with the work material. According to the present embodiment, the covering layer 11 is provided to the cutting portion 3b and not to the gripped portion 3a, and thus a base 12 is exposed at the gripped portion 3a. Here, the arrow Y indicates the rotation direction of the body 3.

An outer diameter D of the cutting portion 3b according to the present embodiment is set to 0.05 mm to 40 mm, for example. Further, a length (edge length) of the cutting portion 3b in the direction along the rotational axis X is set to about 1.5D to 25D.

Examples of the material of the base 12 include a cemented carbide alloy, a cermet, or a metal such as high-speed steel, stainless steel, or titanium. The cemented carbide alloy includes tungsten carbide (WC) and cobalt (Co), and, if desired, includes additives such as titanium carbide (TiC) or chromium carbide ($Cr_3C_2$). The cermet includes titanium carbonitride (TiCN) and cobalt (Co).

The drill 1 includes the cutting edge 5 located at a tip portion of the body 3. The cutting edge 5 is for cutting the work material. The cutting edge 5 according to the present embodiment includes a pair of main cutting edges 5a and a minor cutting edge 5b. The main cutting edges 5a and the minor cutting edge 5b are located at a tip part of the cutting portion 3b. Note that while inclusion of only one main cutting edge 5a is unproblematic, inclusion of the pair of main cutting edges 5a can improve cutting balance.

Figure 3:
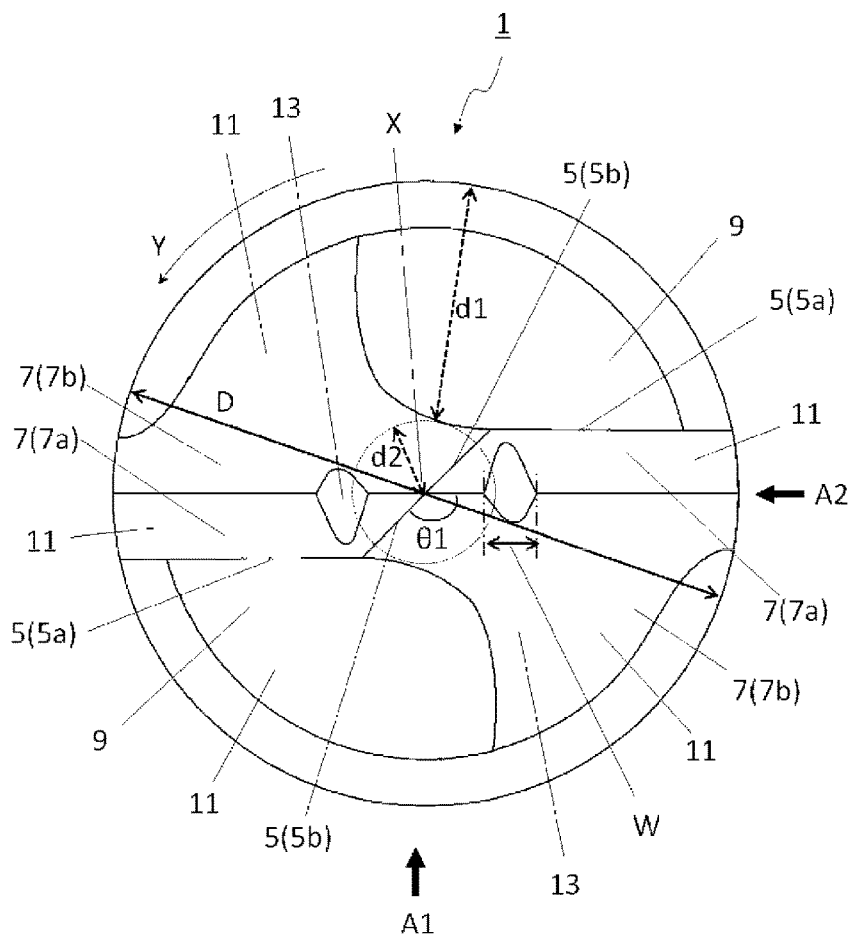
FIG. 3 is a front view of the drill illustrated in FIG. 2 when viewed from the tip portion.
Figure 4:
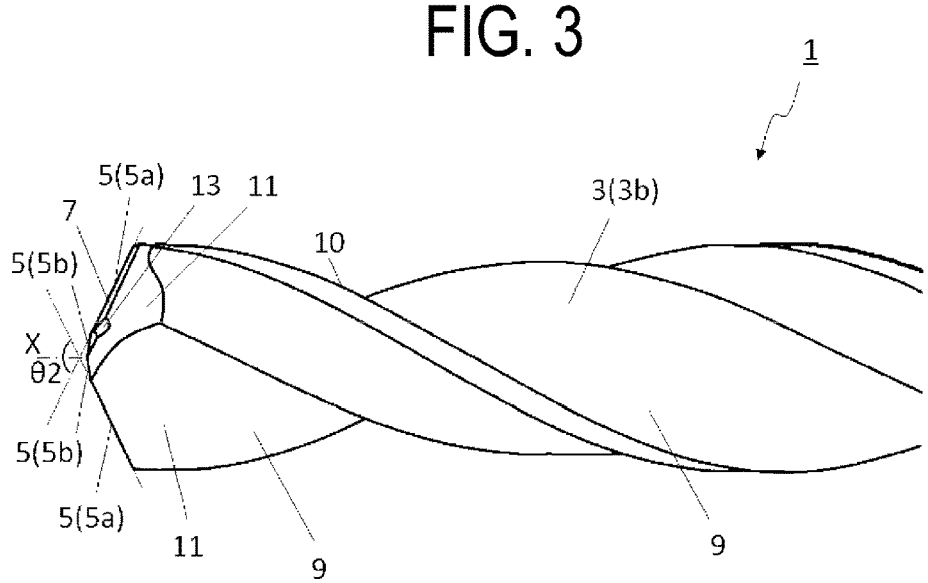
FIG. 4 is a side view from a direction A1 of the drill illustrated in FIG. 3.

The minor cutting edge 5b intersects the rotational axis X when viewed from the tip portion of the body 3. The minor cutting edge 5b according to the present embodiment functions as a so-called chisel edge. The pair of main cutting edges 5a connect to both end portions of the minor cutting edge 5b and, when viewed from the tip portion, extend from both ends of the minor cutting edge 5b toward an outer periphery of the body 3. A chisel angle θ1 of the chisel edge serving as the minor cutting edge 5b is set to 130 to 170°, for example. Note that "when viewed from the tip portion" refers to a front view of the drill 1 from the tip portion side along the rotational axis X, as illustrated in FIG. 3. The minor cutting edge 5b may be omitted, allowing the cutting edge 5 to include only the minor cutting edges 5a.

The pair of main cutting edges 5a are 180° rotation-symmetrical about the rotational axis X of the body 3, when viewed from the tip portion. This makes it possible to suppress shaking that occurs due to a difference in impact between each of the main cutting edges 5a when the pair of main cutting edges 5a bite into the work material during cutting. As a result, stable drilling can be performed. Note that the number of main cutting edges 5a may be three or more.

The main cutting edges 5a according to the present embodiment are linear when viewed from the tip portion, as illustrated in FIG. 3. Further, the main cutting edges 5a are inclined at an inclination angle of 50 to 85°, for example, with respect to the rotational axis X, and a point angle θ2 of the pair of main cutting edges 5a is set to 100 to 170°, for example.

A section of the cutting portion 3b excluding the flutes 9 on the outer peripheral surface, that is, a section located between the pair of flutes 9 on the outer peripheral surface, is a land face. The land face according to the present embodiment includes a margin adjacent to the flutes 9, rearward in the rotational direction of the rotational axis X, and a body clearance adjacent to this margin, rearward in the rotational direction of the rotational axis X. The margin serves as the outer peripheral surface of the cutting portion 3b.

Figure 5:
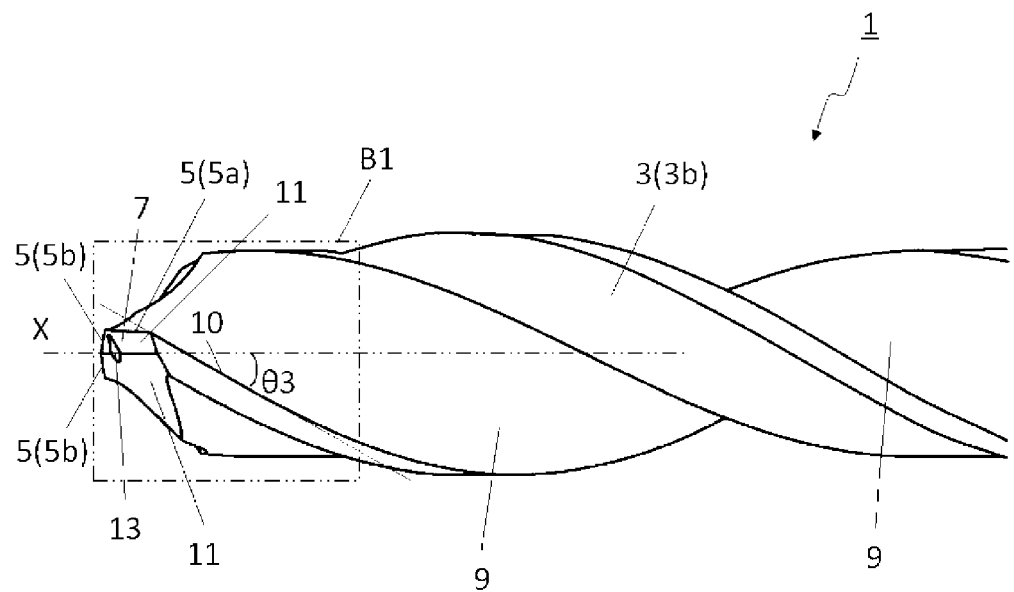
FIG. 5 is a side view from a direction A2 of the drill illustrated in FIG. 3.
Figure 6:
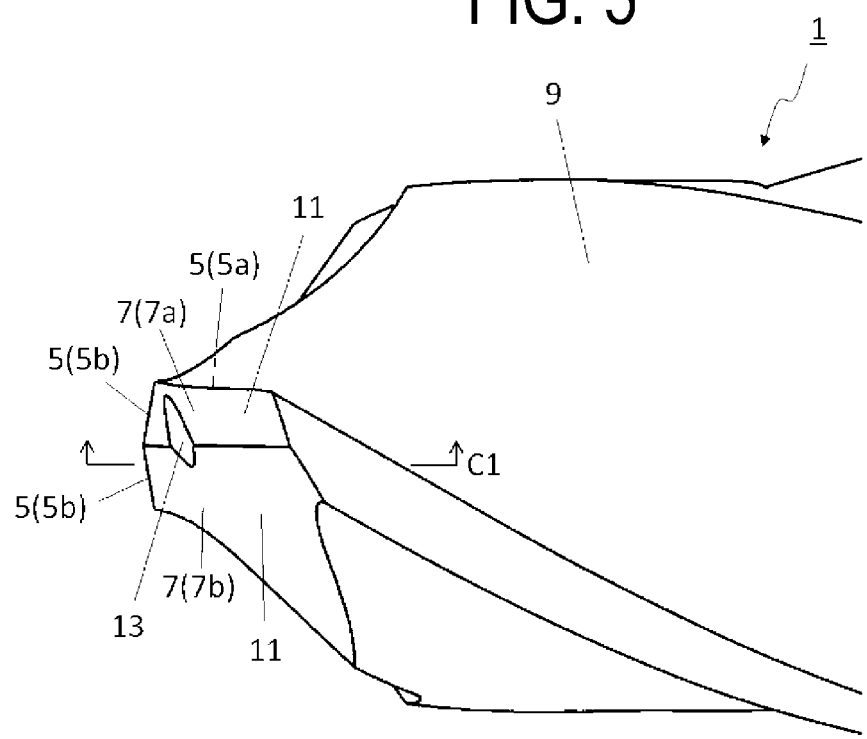
FIG. 6 is an enlarged side view of a region B1 of the drill illustrated in FIG. 5.
Figure 7:
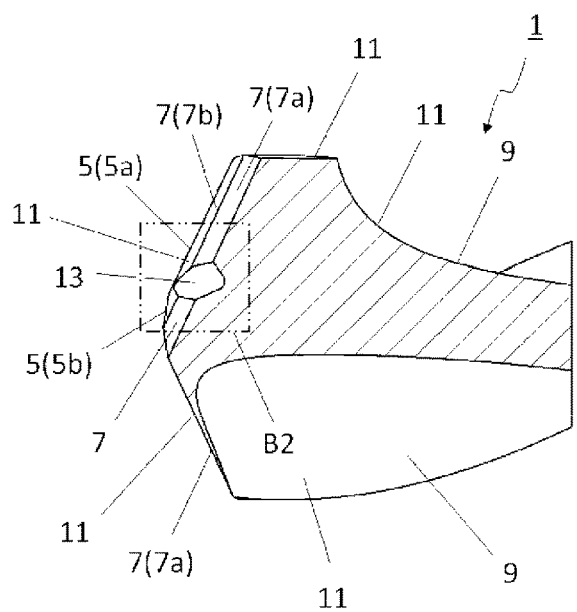
FIG. 7 is a cross-sectional view of a cross section C1 of the drill illustrated in FIG. 6.

In the drill 1 illustrated in FIG. 5, helix angles θ3 of the pair of flutes 9 are designed to be mutually the same, and to be constant from the tip portion to a rear end. Here, the helix angles are not limited thereto, and the pair of flutes 9 may have different helix angles, or the helix angles may differ at the tip portion side and the rear end side, for example. Note that the helix angle θ3 according to the present embodiment refers to the angle formed between the rotational axis X and a line of a leading edge of land, which is an intersecting line 10 formed by the flute 9 and the margin, when viewed from a side of the drill 1.

A depth d1 of the flute 9 may be set to 10 to 40%, for example, with respect to the outer diameter of the cutting portion 3b. Note that the depth d1 of the flute 9 refers to a value obtained by subtracting a distance between a bottom of the flute 9 and the rotational axis X from a radius of the body 3 in the cross section orthogonal to the rotational axis X. That is, a web thickness d2 indicated by a diameter of an inscribed circle of the cross section orthogonal to the rotational axis X at the cutting portion 3b is set to 20 to 80%, for example, with respect to the outer diameter of the cutting portion 3b. Specifically, when the outer diameter of the cutting portion 3b is 1 mm, for example, the depth d1 of the flute 9 may be set to 0.1 to 0.4 mm, and the web thickness d2 may be set to 0.2 to 0.8 mm. Note that the depth d1 and the web thickness d2 of the flute 9 are indicated on the cross section orthogonal to the rotational axis X and, in the front view in FIG. 3, d1 and d2 are indicated by dotted lines as a matter of convenience.

The flanks 7 are provided adjacent to the cutting edge 5 along the pair of main cutting edges 5a, at the tip portion of the body 3. The pair of main cutting edges 5a are each located on a ridge line where the flank 7 and the flute 9 intersect. According to the present embodiment, when viewed from the tip portion, the flanks 7 each include a first flank 7a that comes into contact with the main cutting edge 5a and the minor cutting edge 5b, and a second flank 7b located on the reverse rotation direction side of the first flank 7a.

The first flank 7a has a shape corresponding to the shape of the main cutting edge 5a. For example, when the main cutting edge 5a has a linear shape, the first flank 7a provided along the main cutting edge 5a has a flat surface shape. Further, when the main cutting edge 5a has a recessed curve shape, the first flank 7a provided along the main cutting edge 5a has a recessed curved surface shape. To avoid interference with the work material by the flanks 7, the flanks 7 are each inclined so as to be located on a rear end side of a locus of rotation of the main cutting edge 5a.

At least the tip portion of the body 3 that includes the flanks 7 is covered by the covering layer 11. The covering layer 11 has a high hardness, and thus suppresses the advancement of wear of the body 3 when there is contact with the work material during cut processing.

First preferred examples of the composition of the covering layer 11 include titanium carbide (TiC), titanium nitride (TiN), titanium carbonitride (TiCN), titanium aluminum nitride (TiAlN), alumina ($Al_2O_3$), and the like. The covering layer 11 is formed by coating the tip portion of the body 3 with these materials using a chemical vapor deposition (CVD) method or a physical vapor deposition (PVD) method. A film thickness of the covering layer 11 based on the first preferred examples is set to 0.5 to 20 µm, for example.

Second preferred examples of the composition of the covering layer 11 include diamond and a diamond-like carbon (DLC). For example, the covering layer 11 made from diamond may be formed using a hot filament CVD method and, for example, the covering layer 11 made from DLC may be formed using a PVD method. The film thickness of the covering layer 11 made from diamond is set to 5 to 25 µm, for example. The film thickness of the covering layer 11 based on DLC is set to 0.1 to 1 µm, for example.

Before the covering layer 11 wears, the covering layer 11 may peel from the base 12 as a result of repeated use of the drill 1. In particular, when the covering layer 11 is made from diamond or DLC, the covering layer 11 tends to readily peel from the base 12. In the drill 1, when the covering layer 11 peels and cutting is performed with the exposed base 12 in contact with the work material, the wear of the cutting edge 5 advances rapidly.

The present inventors investigated the peeling of the covering layer 11 in detail, and discovered the following.

The covering layer 11 starts to peel near an outer peripheral portion of the main cutting edge 5a. The peeling of the covering layer 11 advances from near the outer peripheral portion of the main cutting edge 5a, along the main cutting edge 5a and the minor cutting edge 5b, and toward the rotational axis X. When the peeling arrives near the rotational axis X of the cutting edge 5, the area to the covering layer 11 that covers a section that functions as a rake surface peels. Then, when the covering layer 11 that covers the rake surface peels, the center of the tool readily shifts during drilling. As a result, the drill 1 may readily vibrate, increasing the load applied to the drill 1 and increasing the potential for breakage.

Here, in the drill 1 according to the present embodiment, the recessed portion 13 is provided to each of the flanks 7 provided along the main cutting edges 5a. Specifically, one recessed portion 13 is provided to each of the flanks 7 following each of the main cutting edges 5a, adjacent to the main cutting edge 5a. Here, the recessed portion 13 refers to a recessed shape formed by the surface of the covering layer 11 receding with respect to a virtual plane of the flank 7 to the rear end side of the body 3. Further, "the recessed portion 13 adjacent to the main cutting edge 5a" includes the main cutting edge 5a and the recessed portion 13 in contact with each other. While an inner surface of the recessed portion 13 is also covered by the covering layer 11 in the drill 1 according to the present embodiment, the covering layer 11 may not exist on the inner surface of the recessed portion 13, exposing the base 12.

Further, in the recessed portion 13, a width W parallel to the main cutting edge 5a when viewed from the tip portion is greater than the film thickness of the covering layer 11. For example, when the outer diameter D of the cutting portion 3b is 1 mm, the width W of the recessed portion 13 can be set to 50 µm, and the film thickness of the covering layer 11 can be set to 20 µm. Note that the width W of the recessed portion 13 in this specification refers to a maximum value of the widths of the recessed portion 13 of the flank 7, when viewed from the tip portion. When two or more flanks 7 exist and the recessed portion 13 extends across two or more of the flanks 7, the width W is the maximum value of the widths of the recessed portion 13 of the first flank 7a that comes into contact with the main cutting edge 5a. Here, when the main cutting edge 5a has a recessed curve shape, the width W parallel to the main cutting edge 5a is a width parallel to a line that connects an outer peripheral end and an inner peripheral end of the main cutting edge 5a. The width W of the recessed portion 13 can be measured not only in the front view but also in a longitudinal cross section parallel to the main cutting edge 5a.

Figure 8:
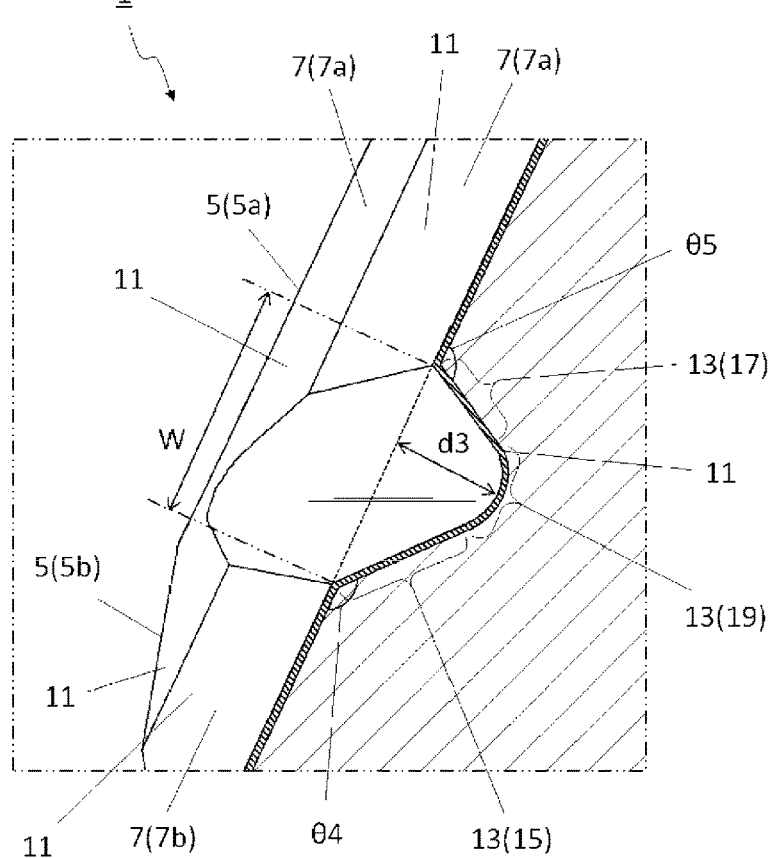
FIG. 8 is an enlarged cross-sectional view of a region B2 of the drill illustrated in FIG. 7.
Figure 9:
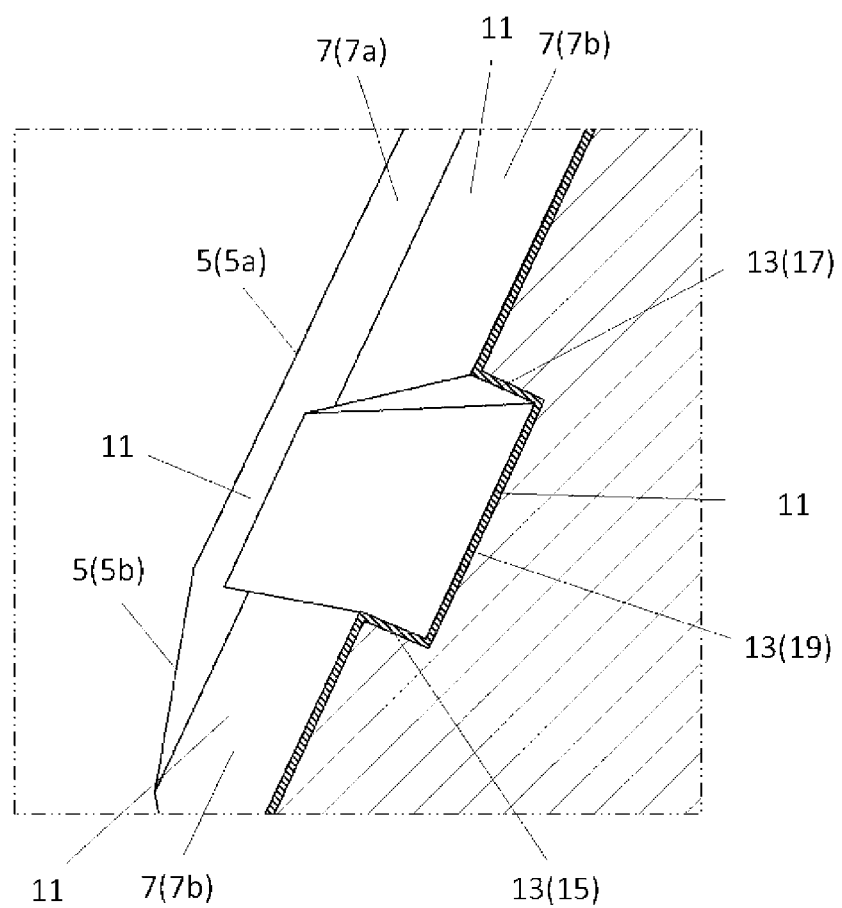
FIG. 9 is a cross-sectional view illustrating a first modified example of the drill illustrated in FIG. 8.
Figure 10:
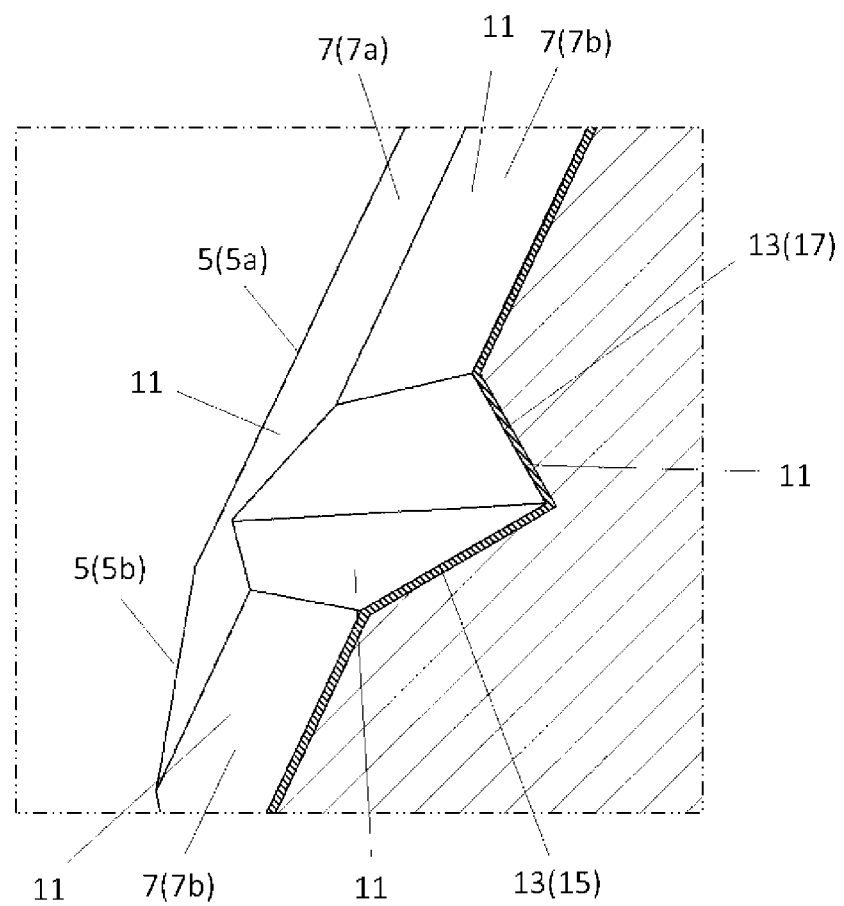
FIG. 10 is a cross-sectional view illustrating a second modified example of the drill illustrated in FIG. 8.

The width W of the recessed portion 13 according to the present embodiment, as illustrated in FIG. 8, is greater than a depth d3 from an opening portion to a bottom portion, when viewed from the tip portion. This makes it possible to suppress a decrease in fracture resistance of the main cutting edge 5a.

In the drill 1 according to the present embodiment, the covering layer 11 has a discontinuous shape that bends or curves with a large curvature at the bottom portion and the opening portion of the recessed portion 13. As a result, even when the covering layer 11 peels near the outer periphery of the main cutting edge 5a and the peeling of the covering layer 11 advances toward the rotational axis X, the discontinuous shape of the bottom portion and the opening portion of the recessed portion 13 prevents the peeling of the covering layer 11 from advancing toward the rotational axis X. That is, in the recessed portion 13, the discontinuous shape prevents the peeling of the covering layer 11, that advances toward the rotational axis X due to the low strength of the covering layer 11, from transforming into a crack along the recessed portion 13 of the covering layer 11 and advancing toward the rotational axis X. As a result, the peeling of the covering layer 11 is suppressed in the section near the rotational axis X of the cutting edge 5, making it possible to improve the useful life of the drill 1. Further, because the peeling of the covering layer 11 occurs unexpectedly, the suppression of the advancement of the peeling of the covering layer 11 of the recessed portion 13 makes it possible to suppress variation in the useful life of the drill 1, allowing replacement of the drill 1 at an appropriate timing.

The recessed portion 13 according to the present embodiment, in FIG. 8 which is a cross section that crosses the recessed portion 13 and is parallel to the rotational axis X, includes a first inner side surface 15, a second inner side surface 17, and a bottom surface 19. The first inner side surface 15 is an inner side surface located toward the center of the body 3, and the second inner side surface 17 is an inner side surface located facing the outer peripheral side of the body 3. The bottom surface 19 is located between the first inner side surface 15 and the second inner side surface 17, and includes a bottom portion of the recessed portion 13.

According to the present embodiment, the first inner side surface 15 and the second inner side surface 17 each have a flat surface shape. Then, a boundary between the opening portion of the recessed portion 13 and the flank 7 bends, and a discontinuous portion is formed in this boundary. This discontinuous portion makes it easier to suppress the advancement of the peeling of the covering layer 11 toward the rotational axis X. This makes it possible to stop the advancement of the peeling of the covering layer 11 near the rotational axis X in a stable manner. Note that the flat first inner side surface 15 and second inner side surface 17 according to the present embodiment refer to linear portions that exist between the opening portion of the recessed portion 13 and the bottom surface 19 of the recessed portion 13 in the cross section that crosses the recessed portion 13 and is parallel to the rotational axis X illustrated in FIG. 8. According to the present embodiment, the linear portions are defined as including the flat first inner side surface 15 and the second inner side surface 17 when the linear portions each have a length equivalent to 0.2 W or greater with respect to the width W. Further, an inner wall surface that abuts against a bottom of the recessed portion 13 more than the first inner side surface 15 and the second inner side surface 17 is defined as the bottom surface.

Here, in FIG. 8, an angle θ4 formed between the first inner side surface 15 and the flank 7 is greater than an angle θ5 formed between the second inner side surface 17 and the flank 7. That is, the angle θ4 formed between the first inner side surface 15, located toward the center of the body 3, and the flank 7 is relatively large, and a ridge line where the second inner peripheral surface and the flank 7 intersect is sharply formed. With the peeling of the covering layer 11 advancing from the outer peripheral side toward the center of the drill 1, the formation of a relatively sharp ridge line where the second inner peripheral surface 17 and the flank 7 intersect makes it easy to suppress the advancement of the peeling of the covering layer 11 of the recessed portion 13, on the outer peripheral side of the drill 1. As a result, it is possible to maintain the state in which the covering layer 11 is formed on the inner surface of the recessed portion 13, making it possible to further extend the useful life of the drill 1.

Further, in FIG. 8, the angle θ4 formed between the first inner side surface 15 and the flank 7 and the angle θ5 formed between the second inner side surface 17 and the flank 7 are both obtuse angles. This makes it possible to suppress a decrease in the fracture resistance of the flank 7.

The bottom surface 19 in FIG. 8 has a recessed curve shape. This makes it possible to suppress fracture from the body 3 during cut processing compared to FIG. 9 in which the bottom surface 19 has a flat surface shape and corner portions are included between the first inner side surface 15 and the second inner side surface 17, or FIG. 10 in which the bottom surface 19 is not included.

Figure 11:
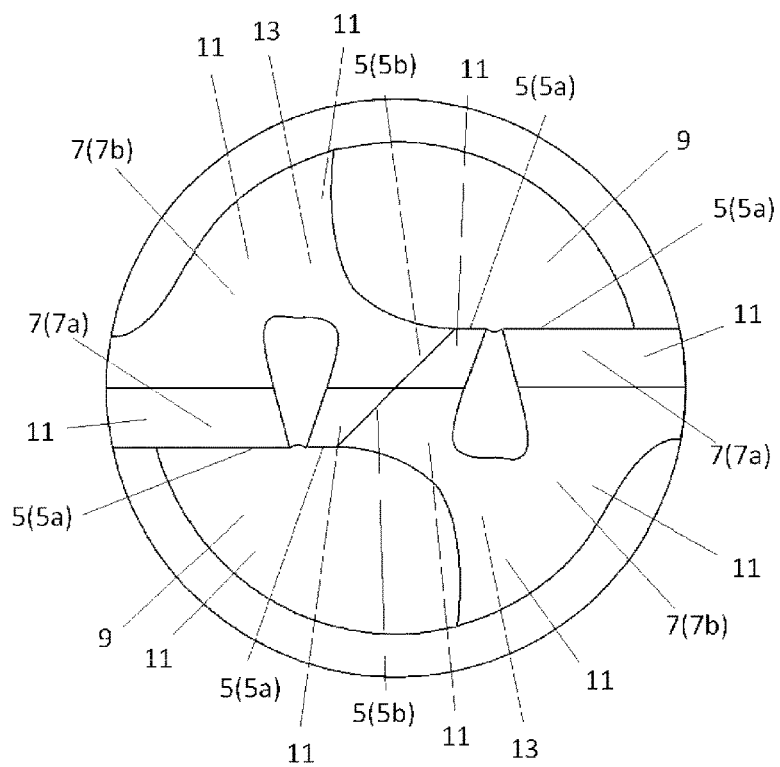
FIG. 11 is a front view illustrating a third modified example of the drill illustrated in FIG. 3.
Figure 12:
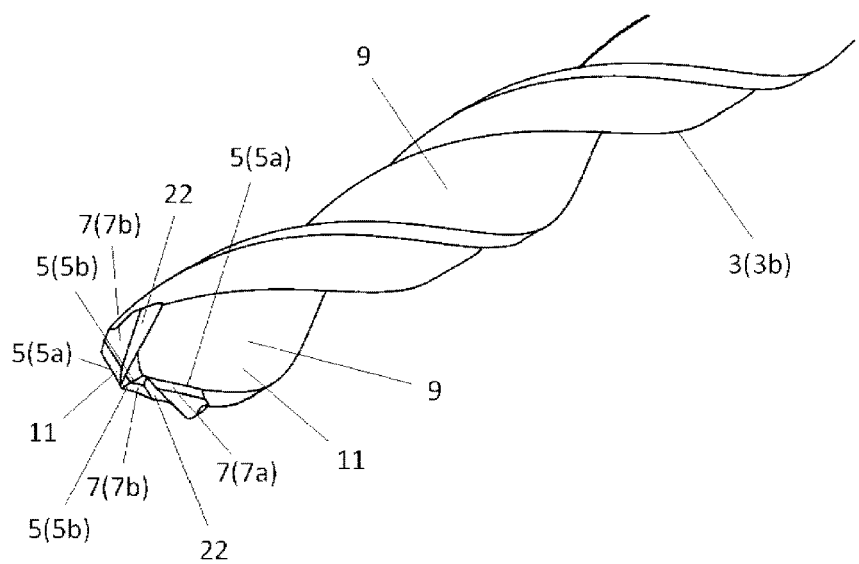
FIG. 12 is an enlarged perspective view of a tip part of a drill according to a second embodiment of the present invention.

While the recessed portion 13 may come into contact with the main cutting edge 5a when viewed from the tip portion as illustrated in FIG. 11, the recessed portion 13 in FIG. 3 is separated from the main cutting edge 5a when viewed from the tip portion. This makes it possible to maintain a high fracture resistance in the main cutting edge 5a while suppressing advancement of the peeling of the covering layer 11. To maintain a high fracture resistance in the main cutting edge 5a, a gap between the recessed portion 13 and the main cutting edge 5a when viewed from the tip portion preferably has a width greater than or equal to the film thickness of the covering layer 11.

The recessed portion 13 according to the present embodiment extends in a direction that intersects and is not parallel to the main cutting edge 5a when viewed from the tip portion. This makes it possible to stop the peeling of the covering layer 11 that advances from the outer peripheral side toward the center of the drill 1 in a stable manner across a wide range, even when the recessed portion 13 has a small surface area. In particular, the peeling of the covering layer 11 in the area serving as the rake face near the rotational axis X can be suppressed. Note that when the surface area of the recessed portion 13 increases, the wear resistance of the covering layer 11 of the flank 7 tends to decrease.

Figure 13:
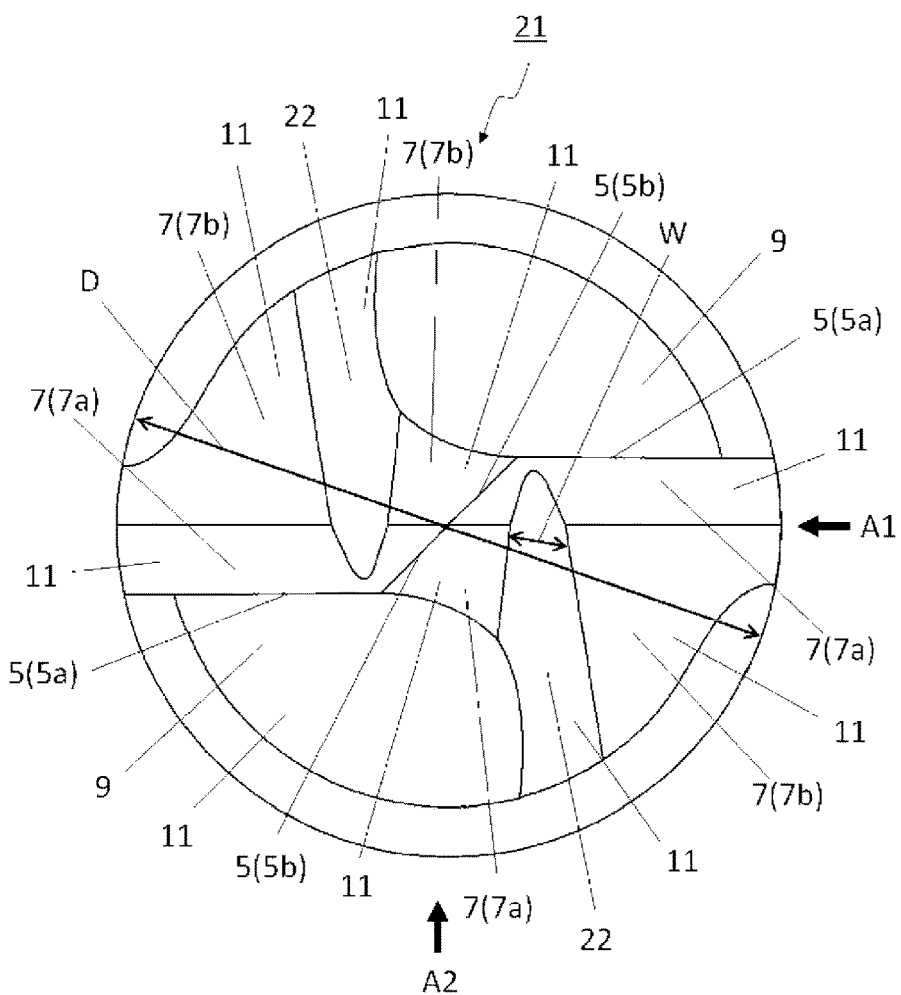
FIG. 13 is a front view of the drill illustrated in FIG. 12 when viewed from the tip portion.
Figure 14:
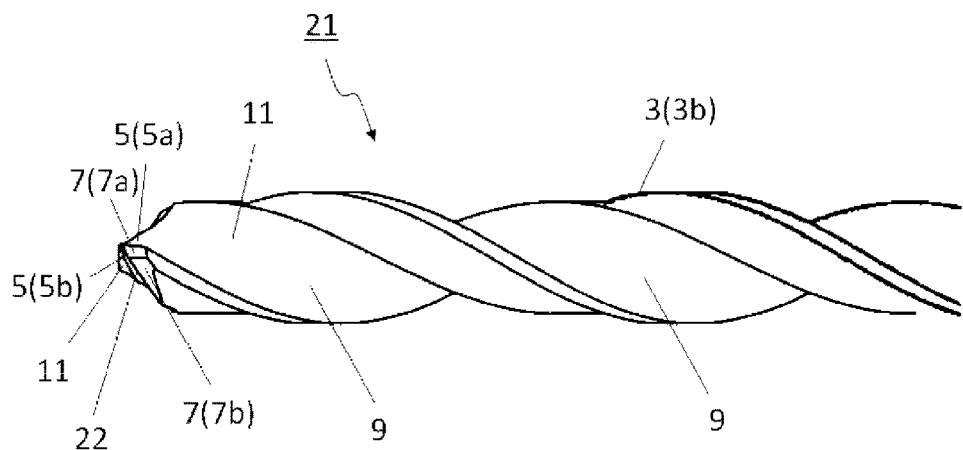
FIG. 14 is a side view from the direction A1 of the drill illustrated in FIG. 13.
Figure 15:
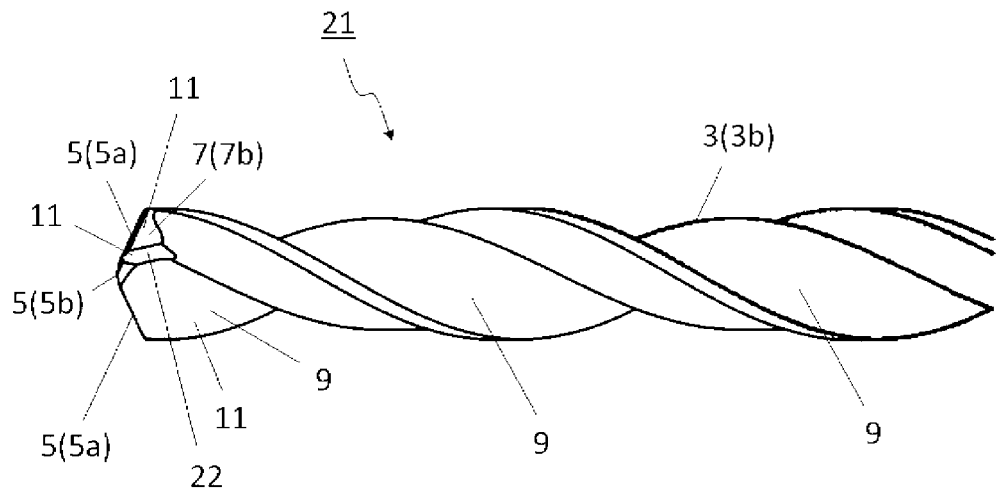
FIG. 15 is a side view from the direction A2 of the drill illustrated in FIG. 13.
Figure 16:
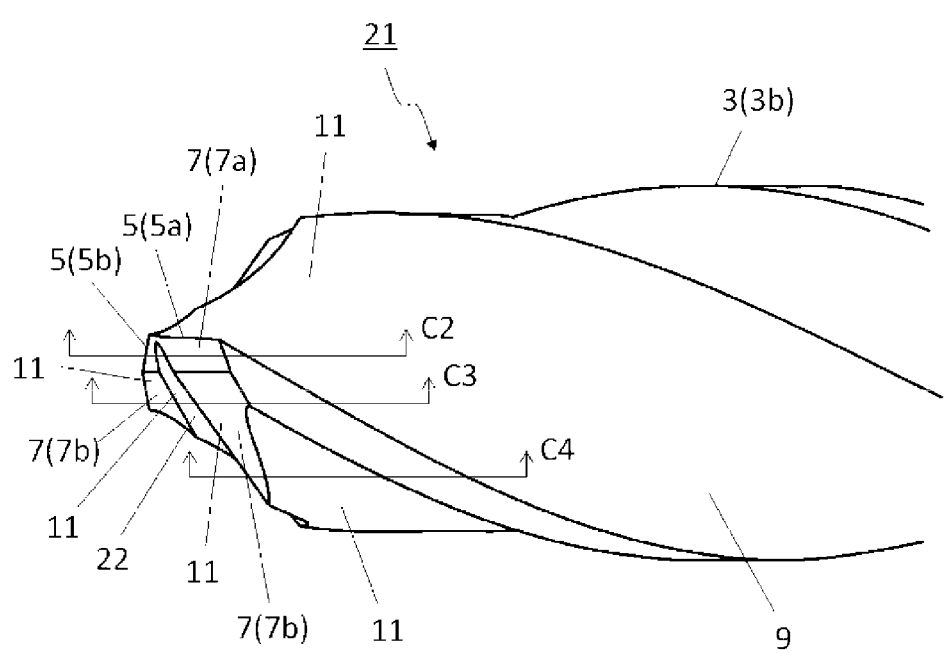
FIG. 16 is an enlarged side view of a tip part of the drill illustrated in FIG. 14.
Figure 17:
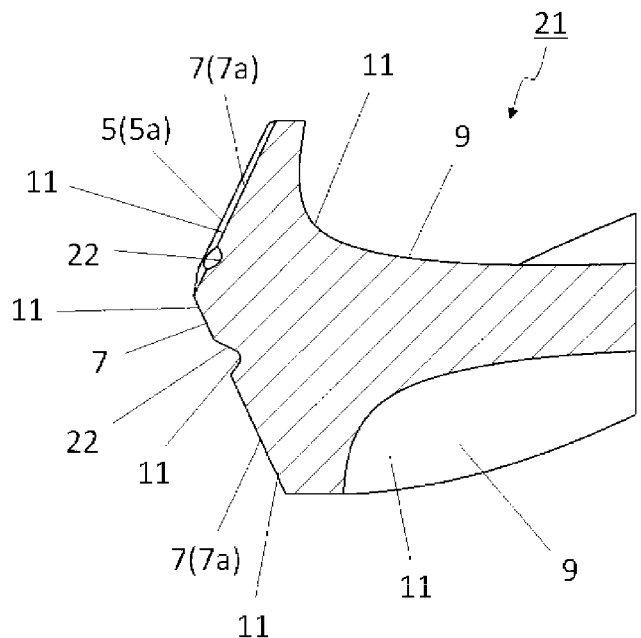
FIG. 17 is a cross-sectional view of a cross section C2 of the drill illustrated in FIG. 16.
Figure 18:
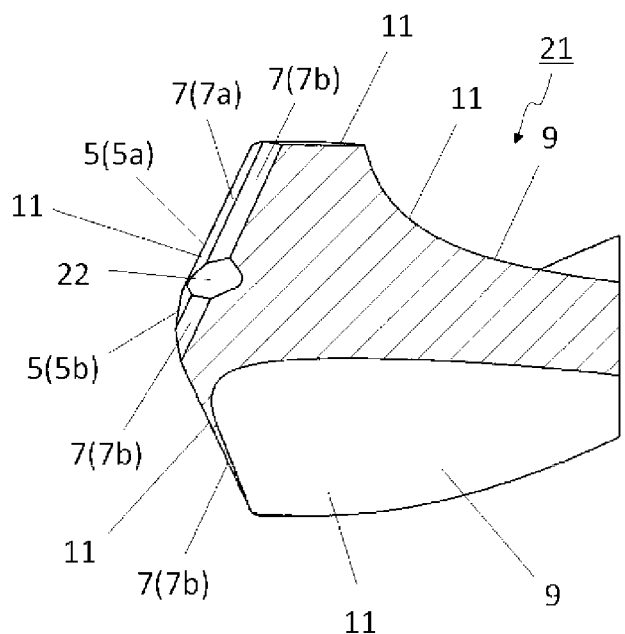
FIG. 18 is a cross-sectional view of a cross section C3 of the drill illustrated in FIG. 16.
Figure 19:
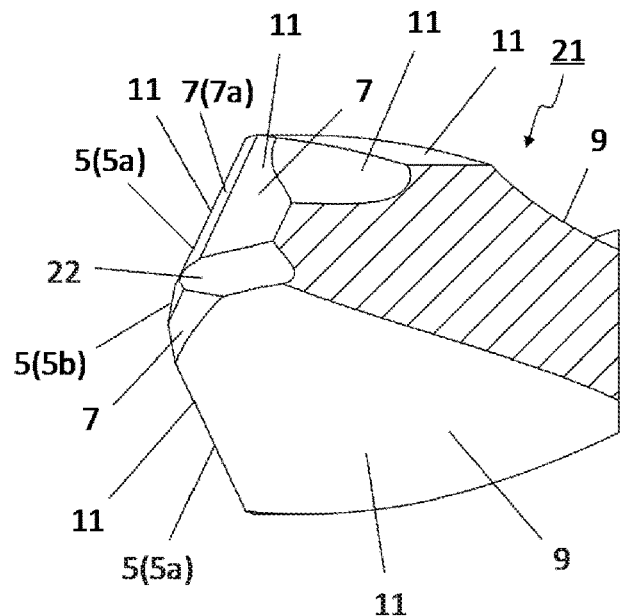
FIG. 19 is a cross-sectional view of a cross section C4 of the drill illustrated in FIG. 16.

The recessed portion may be a groove 22 as in a drill 21 according to a second embodiment illustrated in FIGS. 12 to 19. According to FIGS. 12 to 14, the groove 22 extends in a strip shape from the main cutting edge 5a toward the rear in the rotational direction Y. Further, the groove 22, as illustrated in FIG. 13, extends in a direction that intersects and is not parallel to the main cutting edge 5a when viewed from the tip portion. The cross-sectional shape of the groove 22, as illustrated in FIG. 18, is similar to that of the recessed portion 13 according to the first embodiment. The groove 22 can be easily formed by machining or the like, and is capable of suppressing the peeling of the covering layer 11 in the area serving as the rake face near the rotational axis X, in particular. Note that the groove 22 according to the present embodiment refers to a state in which the recessed portion 13 reaches an outer peripheral end when the drill 21 is viewed from the tip portion.

Figure 20:
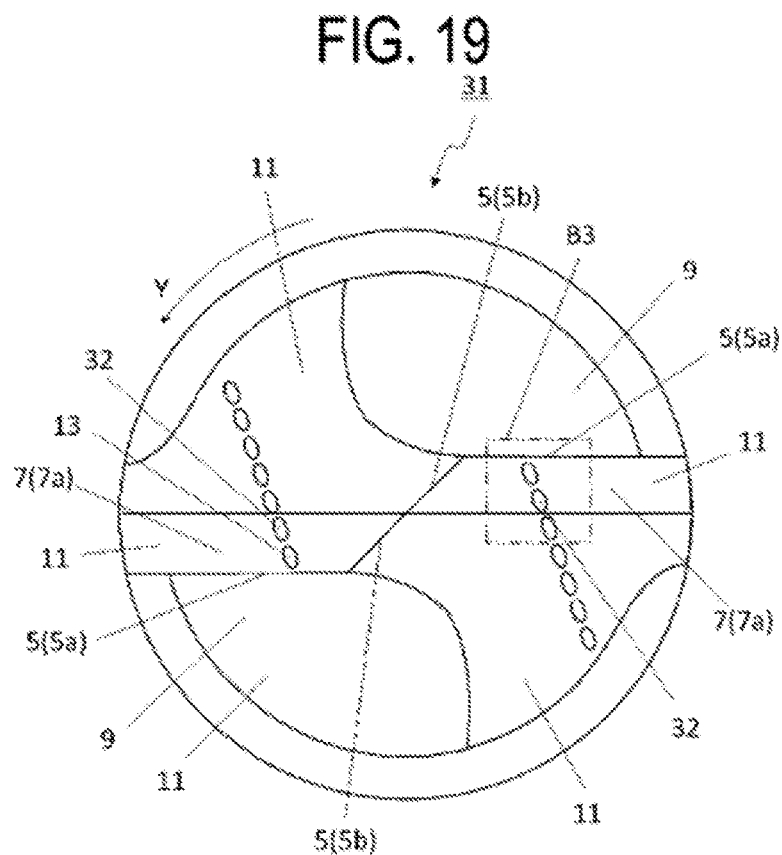
FIG. 20 is a front view of a drill according to a third embodiment of the present invention when viewed from the tip portion.
Figure 21:
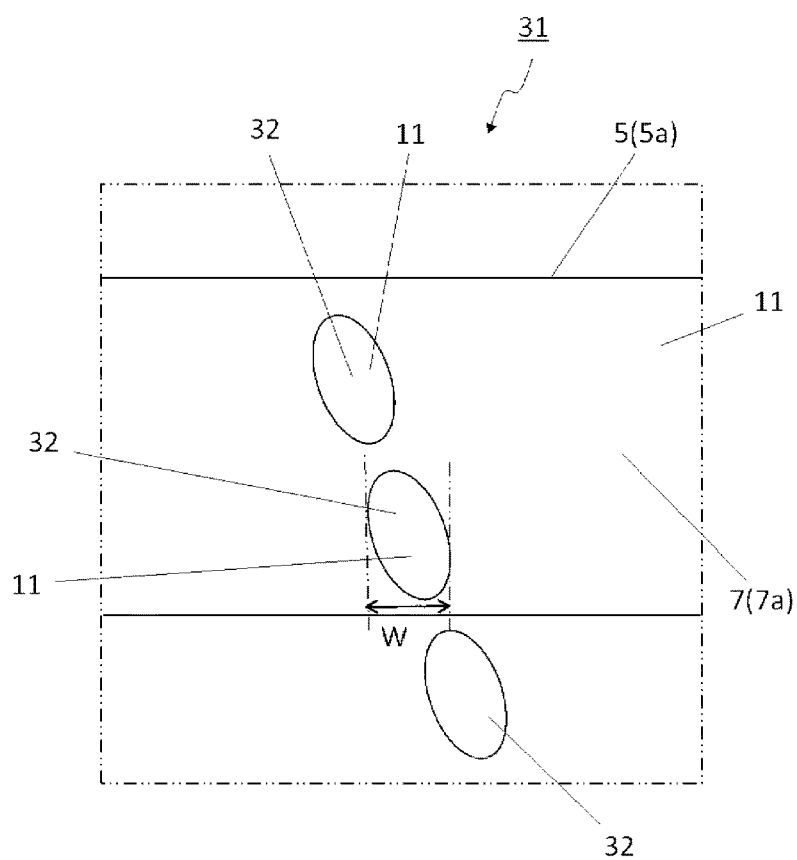
FIG. 21 is an enlarged front view of a region B3 of the drill illustrated in FIG. 20.

A plurality of recessed portions 32 may be provided to each of the flanks 7 as in a drill 31 according to a third embodiment illustrated in FIGS. 20 and 21. According to the front view in FIG. 20, the plurality of recessed portions 32 are aligned in a row, forming a dotted line shape. Further, the recessed portions 32 forming the dotted line shape are aligned in a direction that inclines toward the outer peripheral side with respect to the main cutting edge 5a. As a result, cracks more readily propagate along the recessed portions 32 forming a dotted line shape, making it possible to stop advancement of the peeling of the covering layer 11 in a stable manner. Note that, while not illustrated, recessed portions other than the recessed portions 32 that form a dotted line shape may also exist.

While the plurality of recessed portions 32 may each have a circular shape when viewed from the tip portion, the plurality of recessed portions 32 according to the present embodiment each have an elliptical shape, as illustrated in FIG. 21. Further, when a width of each of the recessed portions 32 in the direction in which the plurality of recessed portions 32 are aligned is greater than a gap between the recessed portions 32 adjacent to each other, the crack further propagates along the dotted line, making it possible to stop the peeling of the covering layer 11 that advances from the outer peripheral side toward the center at the plurality of recessed portions 32 in a more stable manner.

Figure 22:
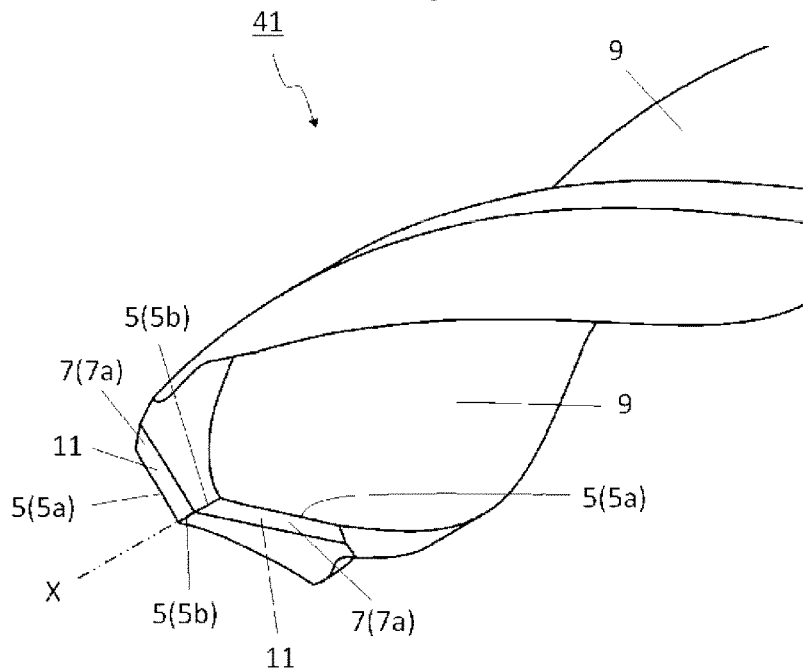
FIG. 22 is an enlarged perspective view of a tip part of a drill according to a fourth embodiment of the present invention.
Figure 23:
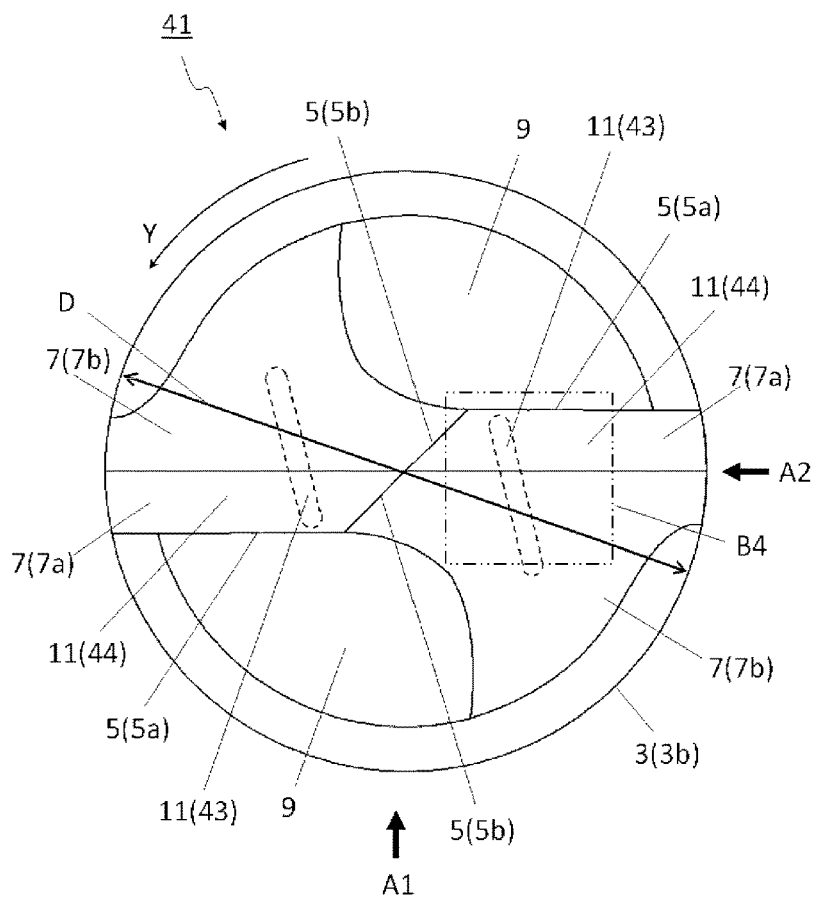
FIG. 23 is a front view of the drill illustrated in FIG. 22 when viewed from the tip portion.
Figure 24:
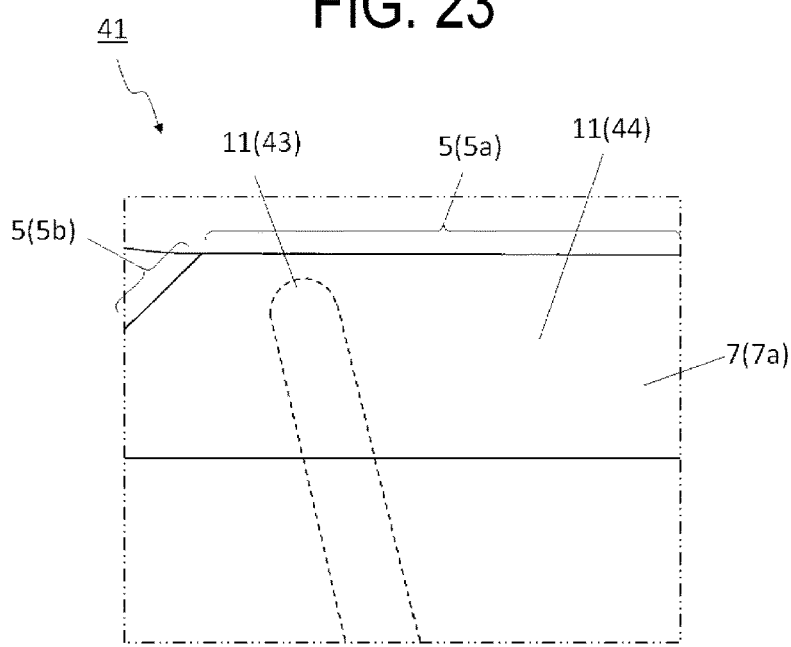
FIG. 24 is an enlarged front view of a region B4 of the drill illustrated in FIG. 23.
Figure 25:
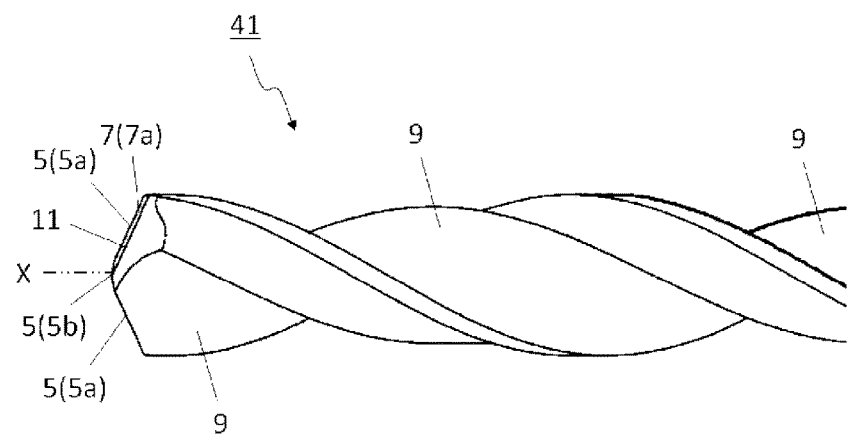
FIG. 25 is a side view from the direction A1 of the drill illustrated in FIG. 23.
Figure 26:
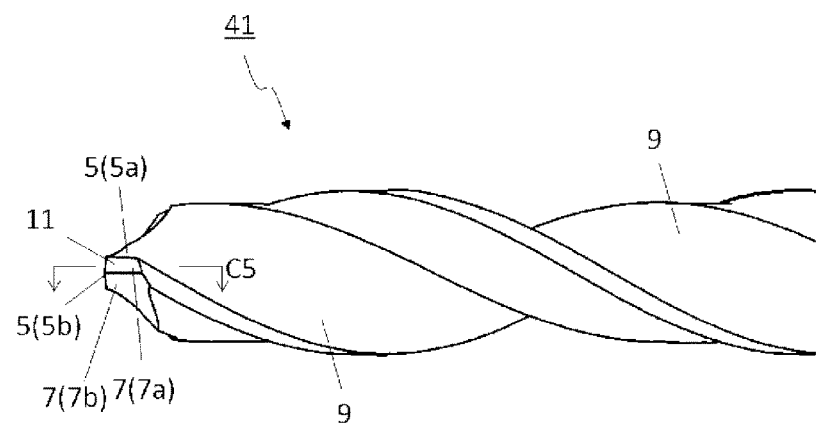
FIG. 26 is a side view from the direction A2 of the drill illustrated in FIG. 23.
Figure 27:
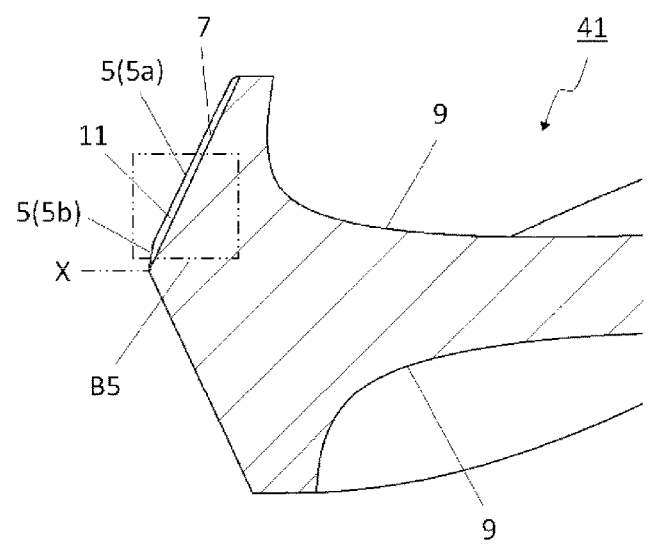
FIG. 27 is a cross-sectional view of a cross section C5 of the drill illustrated in FIG. 26.
Figure 28:
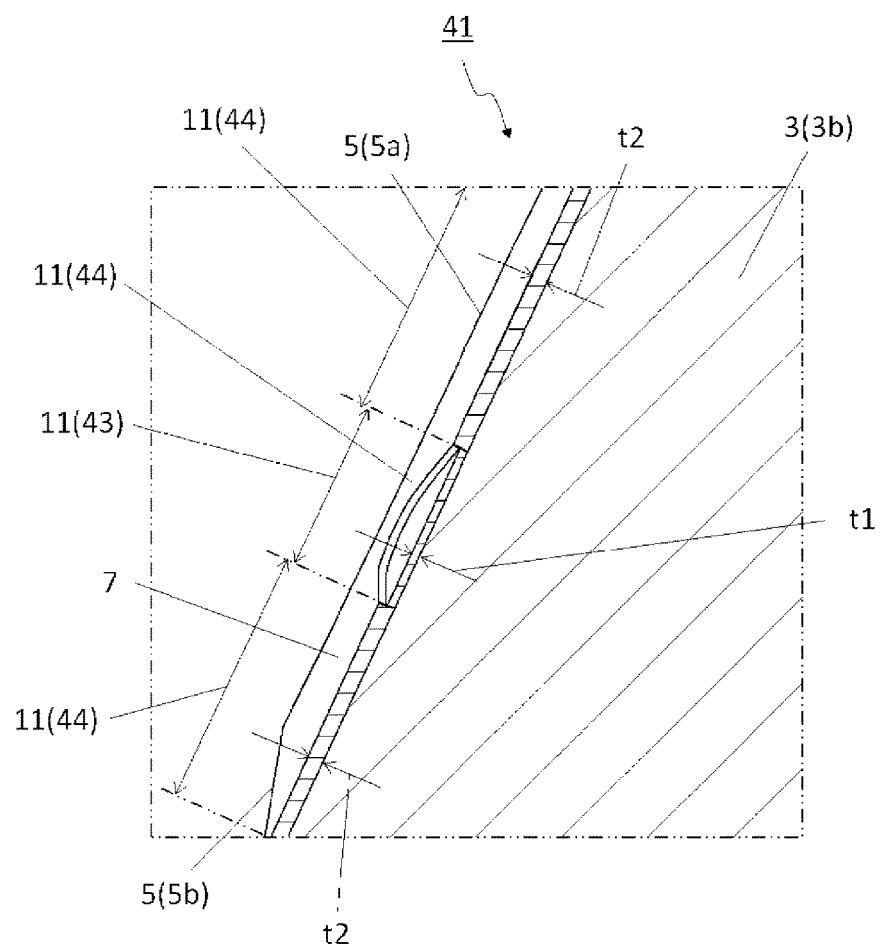
FIG. 28 is an enlarged cross-sectional view of a region B5 of the drill illustrated in FIG. 27.

A drill 41 according to a fourth embodiment illustrated in FIGS. 22 and 23 includes a thin layer region 43 in which the thickness of the covering layer 11 that covers the flank 7 is thinner than that of other regions. Note that, in the following, the other regions having a relatively thick thickness are referred to as regular regions 44 as a matter of convenience. In FIG. 28, given t1 as the thickness of the covering layer 11 in the thin layer region 43 and t2 as the thickness of the covering layer 11 in the regular regions 44, t1<t2 holds.

Then, in the front view in FIG. 23, the thin layer region 43 extends in a direction that inclines with respect to the main cutting edge 5a, and a pair of the regular regions 44 sandwich the thin layer region 43. Specifically, the thin layer region 43 exists from the outer peripheral end of the covering layer 11 that covers the flank 7 to a center near the rotational axis X. As a result, even when peeling starts near an outer end of the main cutting edge 5a, the advancement of the peeling of the covering layer 11 toward the rotational axis X in the thin layer region 43 is suppressed. This suppression of the peeling of the covering layer 11 near the rotational axis X of the flank 7 makes it possible to extend the useful life of the drill 1.

While a step exists between the thin layer region 43 and the regular regions 44, the thicknesses of the covering layer 11 in the thin layer region 43 and the regular regions 44 do not need to be constant. According to the present embodiment, the maximum value of the thicknesses of the covering layer 11 in the thin layer region 43 is less than a minimum value of the thicknesses of the covering layer 11 in the regular regions 44.

Examples of specific methods for forming the thin layer region 43 include first, when forming the covering layer 11, partially forming the covering layer 11 across the entire region where the covering layer 11 of the body 3 is to be formed, masking the section that is to serve as the thin layer region 43, and then additionally forming the covering layer 11 in only the regular regions 44 other than the thin layer region 43. As a result, the masked region becomes the thin layer region 43, and the non-masked regions become the regular regions 44.

Additionally, the thin layer region 43 may be formed by first masking the section that is to serve as the thin layer region 43, partially forming the covering layer 11 in the regular regions only, removing the masking, and then additionally forming the covering layer 11 across the entire region where the covering region 11 is to be formed. Or, a method of forming the covering layer 11 in the thin layer region 43 in the same manner as in the regular regions 44, and then removing at least a portion of the covering layer 11 in the thin layer region 43 by laser processing or the like may be applied as well.

According to the present embodiment, the thin layer region 43 extends in a direction that intersects and is not parallel to the main cutting edge 5a when viewed from the tip portion. This makes it possible to stop the peeling of the covering layer 11 that advances from the outer peripheral side toward the center of the drill 1 in a stable manner across a wide range.

For example, when the outer diameter D of the cutting portion 3b is set to 1 mm, the width W of the thin layer region 43 may be set to 0.05 mm, and the thickness t1 of the covering layer 11 in the thin layer region 43 may be set to 0.01 mm.

Figure 29:
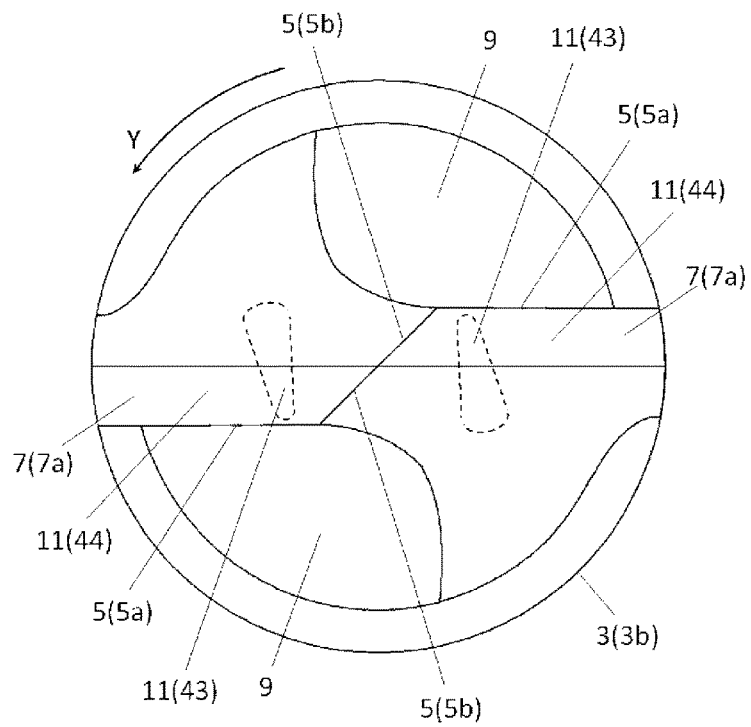
FIG. 29 is a front view illustrating a first modified example of the drill illustrated in FIG. 23.
Figure 30:
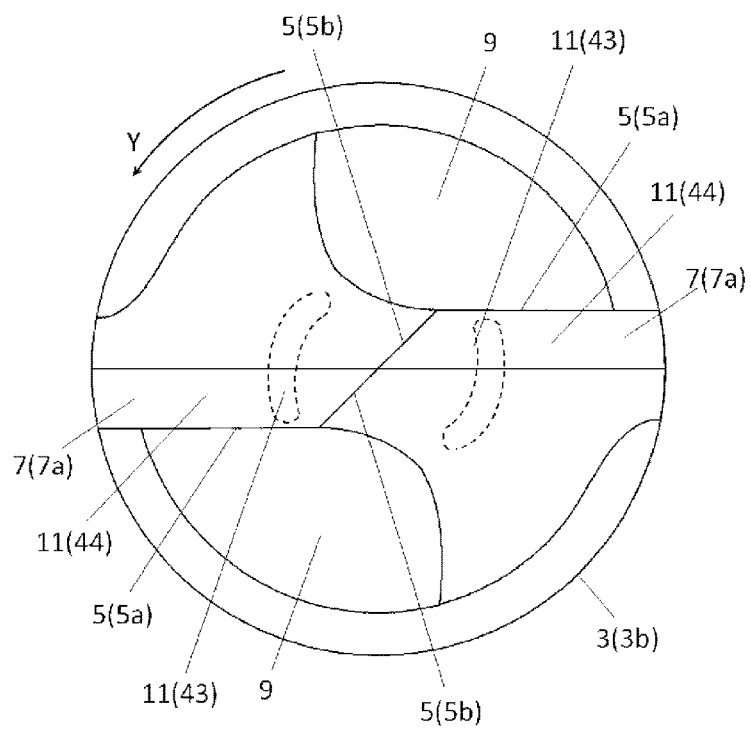
FIG. 30 is a front view illustrating a second modified example of the drill illustrated in FIG. 23.
Figure 31:
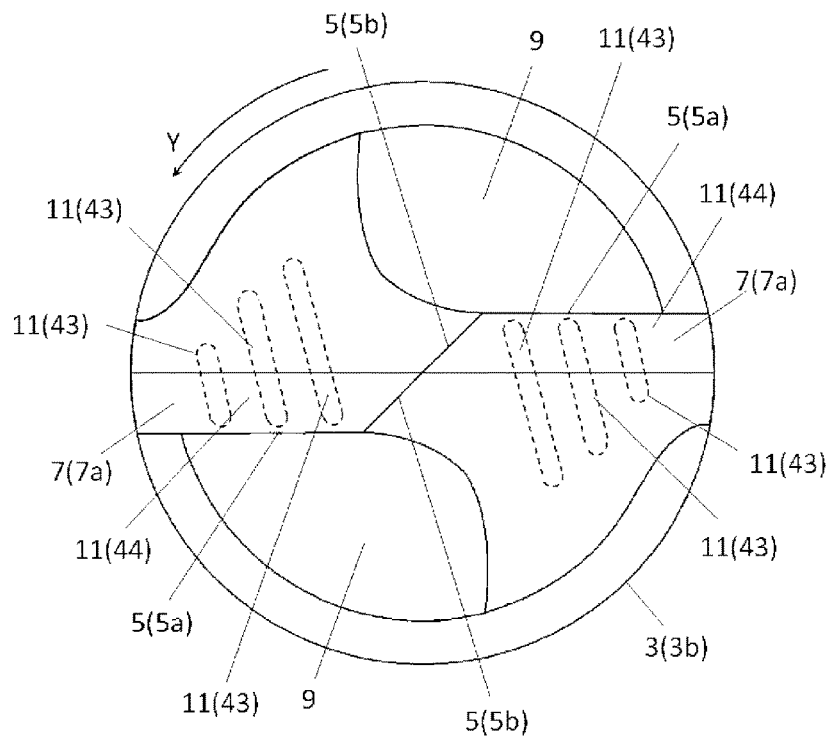
FIG. 31 is a front view illustrating a third modified example of the drill illustrated in FIG. 23.

Note that the width of the thin layer region 43, as illustrated in FIG. 29, may increase as a distance from the main cutting edge 5a increases. Thus, even when there is variation in the direction of a crack that occurs in the thin layer region 43, it is possible to suppress propagation toward the rotational axis X of the covering layer 11 by the thin layer region 43 in a stable manner. Further, the thin layer region 43, as illustrated in FIG. 30, may curve toward the inner peripheral. This makes it possible to more effectively suppress the peeling of the covering layer 11 near the rotational axis X. Furthermore, as illustrated in FIG. 31, a plurality of the thin layer regions 43 may be formed in each of the flanks 7. Then, even if the covering layer 11 is not divided by one of the thin layer regions 43, the covering layer 11 can be divided by another one of thin layer regions 43. This makes it possible to divide the covering layer 11 in a stable manner.

Figure 32:
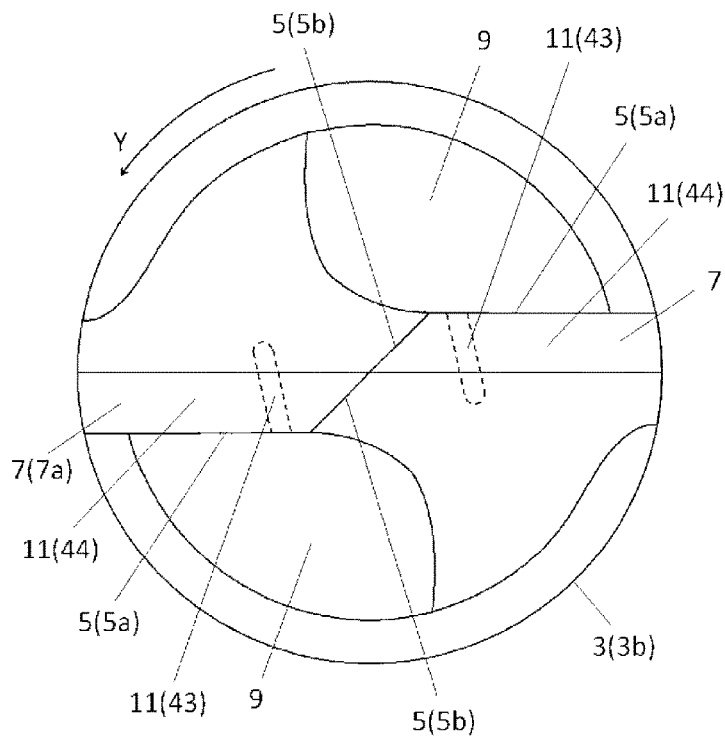
FIG. 32 is a front view illustrating a fourth modified example of the drill illustrated in FIG. 23.
Figure 33:
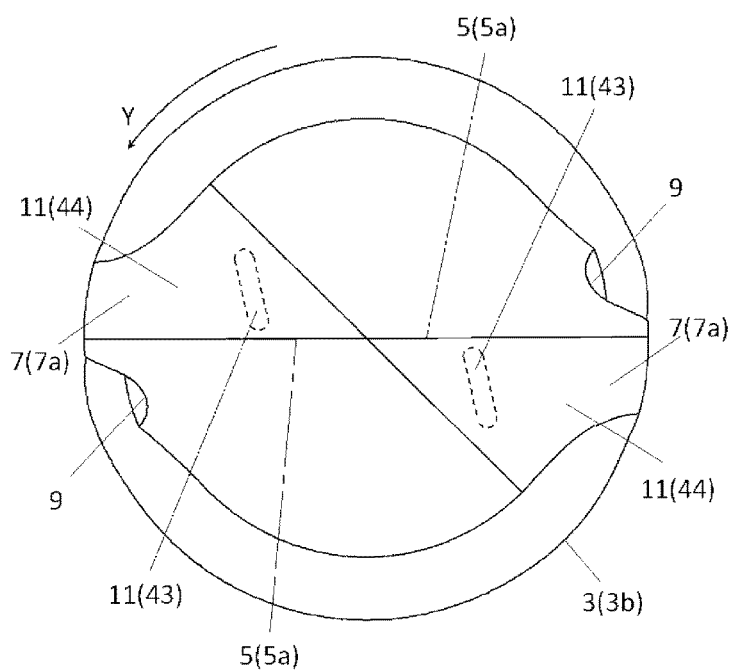
FIG. 33 is a front view illustrating a fifth modified example of the drill illustrated in FIG. 23.

Furthermore, while the thin layer region 43 may come into contact with the main cutting edge 5a when viewed from the tip portion as illustrated in FIG. 32, separation of the thin layer region 43 from the main cutting edge 5a when viewed from the tip portion as in the thin layer region 43 illustrated in FIG. 23 makes it possible to maintain a high fracture resistance in the main cutting edge 5a while suppressing the advancement of the peeling of the covering layer 11. To maintain a high fracture resistance in the main cutting edge 5a, a gap between the thin layer region 43 and the main cutting edge 5a when viewed from the tip portion preferably has a width greater than or equal to the film thickness of the covering layer 11. Further, the minor cutting edge 5b may not be included, as illustrated in FIG. 33. The configurations of FIGS. 29 to 32 may be applied to embodiments other than the fourth embodiment as well.

Figure 34:
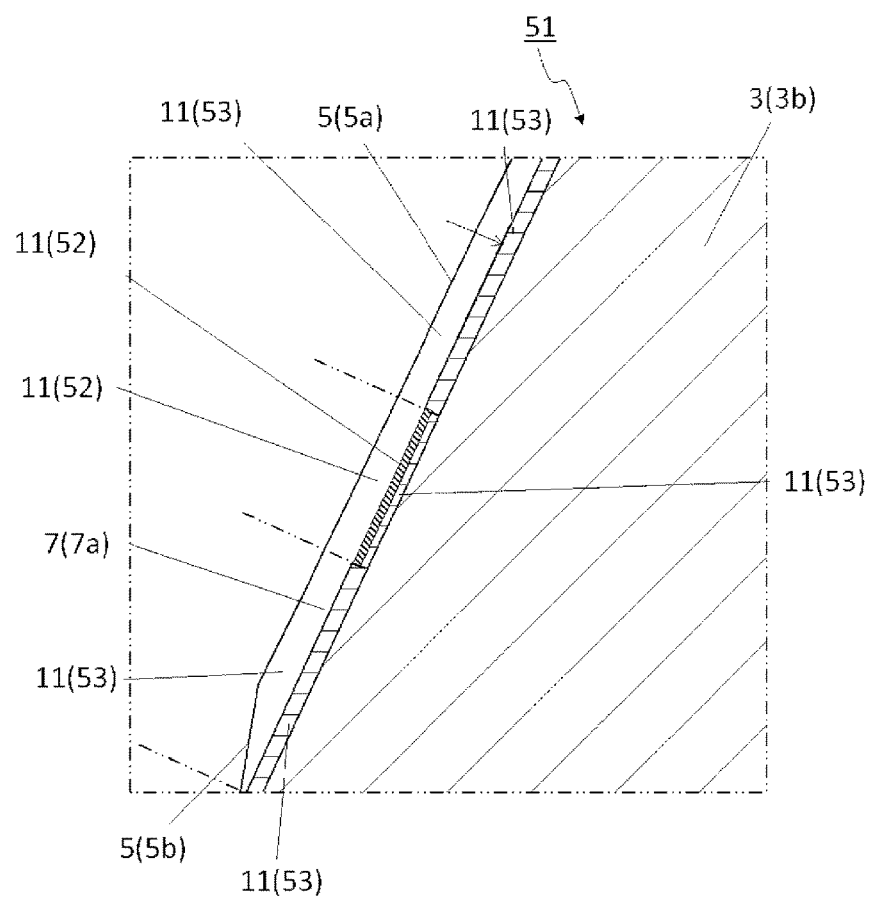
FIG. 34 is an enlarged cross-sectional view of a main portion of a drill according to a fifth embodiment of the present invention.
Figure 35:
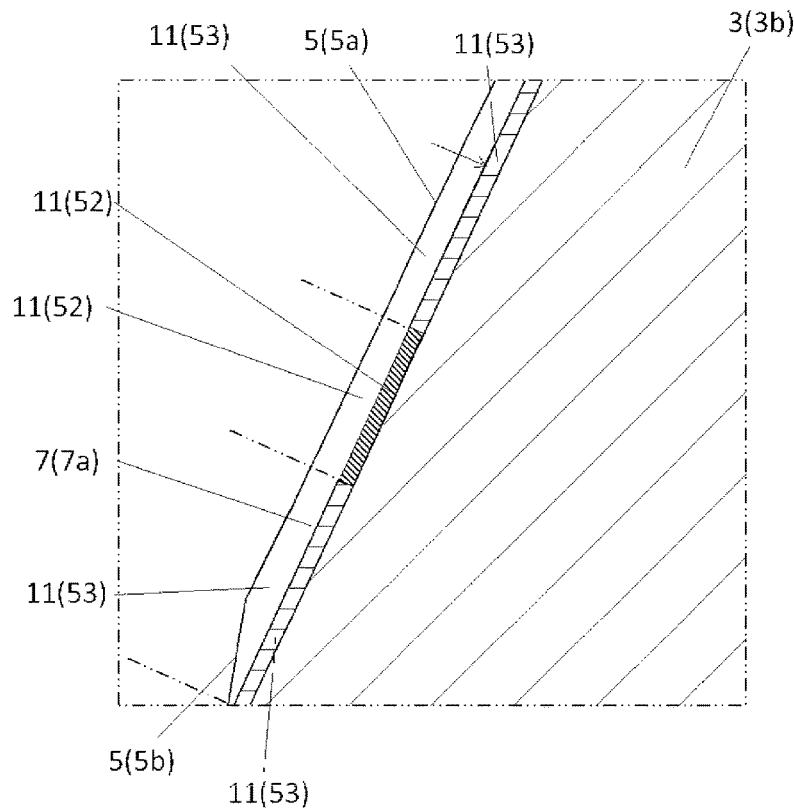
FIG. 35 is a cross-sectional view illustrating a first modified example of the drill illustrated in FIG. 34.

Further, while the drill according to the embodiments described above includes a recessed portion, a drill 51 illustrated in FIGS. 34 and 35 may, according to a fifth embodiment, for example, include a first layer 52 and a second layer 53, the first layer 52 having a low hardness and provided in place of the recessed portion. Note that the region other than the first layer 52 having a relatively high hardness is referred to as the second layer 53 below as a matter of convenience. As illustrated in FIG. 34, the second layer 53 may be interposed between the first layer 52 and the base 12 and, as illustrated in FIG. 35, the first layer 52 may come into contact with the surface of the base 12.

Examples of specific methods for forming the first layer 52 include forming the second layer 53 in the section serving as the first layer 52 as well, and then transforming the second layer 53 into the first layer 52 by laser processing or the like. Additionally, for example, when diamond is used to form the covering layer 11, other applicable methods include decreasing the degree of diamond crystallization in the first layer 52 by inhibiting diamond growth by increasing the cobalt content in the area where the first layer 52 is to be formed on the surface of the base 12 prior to film formation to a greater degree than other areas, not performing etching in the area where the first layer 52 is to be formed via masking, or the like.

Other preferably applicable configurations of the first layer 52 and the second layer 53 include a configuration that conforms to the thin layer region 43 and the regular regions 44 according to the fourth embodiment.

Method for Manufacturing Machined Product

Next, the method for manufacturing a machined product according to the embodiment of the present invention will be described in detail using the drill 1 according to the aforementioned embodiment as an example. Below, description will be given with reference to FIGS. 36 to 38. The method for manufacturing a machined product according to the present embodiment includes the following steps (1) to (4).

Figure 36:
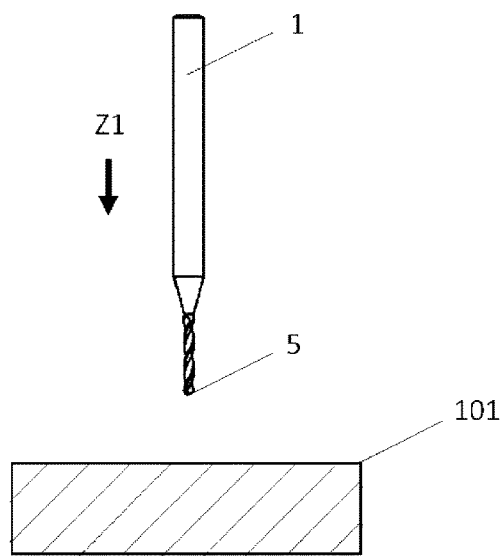
FIG. 36 is a schematic view illustrating one step of a method for manufacturing a machined product according to an embodiment of the present invention.

(1) Arranging the drill 1 above a prepared work material 101 (refer to FIG. 36). (2) Rotating the drill 1 in the direction of the arrow Y about the rotational axis X, and bringing the drill 1 close to the work material 101 in the Z1 direction (refer to FIGS. 36 and 37). This step, for example, may be performed by fixing the work material 101 on a table of the machine tool having the drill 1 installed thereto, and bringing the drill 1 close to the work material 101 while rotating the drill 1. Note that, in this step, the work material 101 and the drill 1 may be brought relatively close to each other, or the work material 101 may be brought close to the drill 1.

Figure 37:
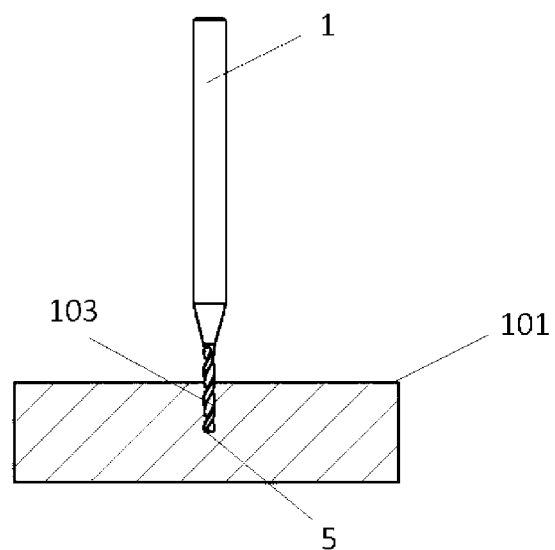
FIG. 37 is a schematic view illustrating one step of the method for manufacturing a machined product according to an embodiment of the present invention.

(3) Bringing the drill 1 closer to the work material 101, causing the cutting edge 5 of the drill 1 that is rotating to come into contact with a desire position on a surface of the work material 101 to form a machined hole 103 (through-hole) in the work material 101 (refer to FIG. 37). In this step, the pair of the main cutting edges and the minor cutting edge serving as the cutting edge 5 are caused to come into contact with a desired position on the surface of the work material 101. Further, from the viewpoint of obtaining a favorable finished surface, the drill 1 is preferably set so that a portion of the region on the rear end side of the cutting portion of the drill 1 does not penetrate the work material 101. That is, this portion of the region is made to function as a region for chip discharge, thereby making it possible to achieve excellent chip dischargeability via the region.

Figure 38:
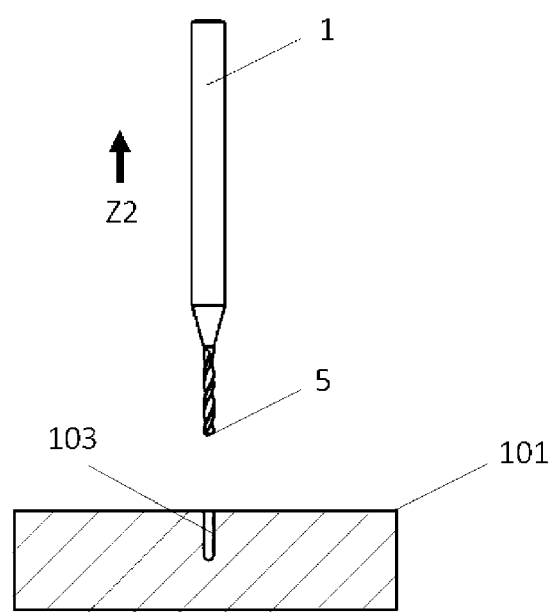
FIG. 38 is a schematic view illustrating one step of the method for manufacturing a machined product according to an embodiment of the present invention.

(4) Separating the drill 1 from the work material 101 in the Z2 direction (refer to FIG. 38). In this step as well, similar to the step (2) above, the work material 101 and the drill 1 may be relatively separated from each other, or the work material 101 may be separated from the drill 1, for example.

Through such steps as described above, it is possible to achieve the machined product according to the present embodiment. With use of the drill 1 according to the present embodiment, it is possible to achieve excellent hole workability. Here, when the cut processing on the work material 101 as described above is carried out a plurality of times, and, for example, a plurality of machined holes 103 are formed in one work material 101, the bringing of the cutting edge of the drill 1 into contact with a different location of the work material 101 may be repeated with the drill 1 being rotated.

REFERENCE SIGNS LIST 1, 21, 31, 41, 51 Drill
3 Body
3a Gripped portion
3b Cutting portion
5 Cutting edge
5a Main cutting edge
5b Minor cutting edge (chisel edge)
7 Flank
7a First flank
7b Second flank
9 Flute (discharge flute)
10 Intersecting line
11 Covering layer
12 Base
13 Recessed portion
15 First inner side surface
17 Second inner side surface
19 Bottom surface
101 Work material
103 Machined hole (through-hole)

What is claimed is:

1. A drill comprising:
a body having a rod shape configured to rotate about a rotational axis;
a cutting edge that is located at a tip portion of the body and extends from an outer periphery of the body toward the rotational axis in a front view viewed from the tip portion;
a flank located at the tip portion and disposed along the cutting edge;
a covering layer that covers at least the tip portion of the body; and
one or more recessed portions disposed on the flank at positions close to the cutting edge, wherein
the recessed portion is separated from the cutting edge in the front view and is defined by a first dimension and a second dimension,
the first dimension is defined by a longest length from a first end to a second end of the recessed portion in a direction that intersects the cutting edge in the front view,
the second dimension is defined by a longest length of the recessed portion in a direction that is parallel to the cutting edge in the front view,
the first dimension is longer than the second dimension,
a width of the recessed portion increases from the first end to a maximum value as the second dimension and then decreases from the maximum value to the second end,
the maximum value is offset from a midpoint of the first dimension,
the recessed portion comprises a first inner side surface that is flat and positioned toward a center of the body, and a second inner side surface that is flat and positioned facing an outer peripheral side of the body, in a cross section that crosses the recessed portion and is parallel to the rotational axis, and
the recessed portion further comprises a bottom surface having a recessed curve shape that connects the first inner side surface and the second inner side surface, in the cross section that crosses the recessed portion and is parallel to the rotational axis.

2. The drill according to claim 1,
wherein an angle formed between the first inner side surface and the flank is greater than an angle formed between the second inner side surface and the flank, in a cross section that crosses the recessed portion and is parallel to the rotational axis.

3. The drill according to claim 1,
wherein the maximum value of the width of the recessed portion parallel to the cutting edge is greater than a depth from an opening portion to a bottom portion of the recessed portion.

4. A method for manufacturing a machined product, the method comprising:
   rotating the drill according to claim 1 about the rotational axis;
   causing the cutting edge of the drill that is rotating to come into contact with a work material; and
   separating the drill from the work material.

\* \* \* \* \*